US009357233B2

(12) United States Patent
Lee et al.

(10) Patent No.: US 9,357,233 B2
(45) Date of Patent: May 31, 2016

(54) VIDEO DECODER ERROR HANDLING

(75) Inventors: Yen-Chi Lee, San Diego, CA (US); Min Dai, San Diego, CA (US); Chia-Yuan Teng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2303 days.

(21) Appl. No.: 12/170,991

(22) Filed: Jul. 10, 2008

(65) Prior Publication Data
US 2009/0213938 A1   Aug. 27, 2009

Related U.S. Application Data

(60) Provisional application No. 61/031,438, filed on Feb. 26, 2008.

(51) Int. Cl.
*H04N 7/12* (2006.01)
*H04N 19/68* (2014.01)
*H04N 19/70* (2014.01)
*H04N 19/46* (2014.01)
(Continued)

(52) U.S. Cl.
CPC ............ *H04N 19/68* (2014.11); *H04N 19/105* (2014.11); *H04N 19/134* (2014.11); *H04N 19/174* (2014.11); *H04N 19/46* (2014.11); *H04N 19/573* (2014.11); *H04N 19/61* (2014.11); *H04N 19/70* (2014.11); *H04N 19/895* (2014.11)

(58) Field of Classification Search
None
See application file for complete search history.

(56) References Cited

U.S. PATENT DOCUMENTS 5,854,799 A * 12/1998 Okada .................. H04N 19/00
                                                      345/473
6,215,820 B1   4/2001 Bagni et al.
(Continued)

FOREIGN PATENT DOCUMENTS

CN   1511420 A   7/2004
EP   1089570 A2  4/2001
(Continued)

OTHER PUBLICATIONS

Xiaowei Ding et al. : "A novel bitstream level joint channel error concealment scheme for realtime vidoe over wireless networks", Twenty-Third Annual Joint Onference of the IEEE Computer and Communications Societies, (INFOCOM 2004) IEEE, Piscataway, NJ, USA, vol. 3, Mar. 7, 2004, pp. 2163-2173, XPO10740571 ISBN: 978-0-7803-8355-5.*

(Continued)

*Primary Examiner* — Christopher Crutchfield
*Assistant Examiner* — Thinh Tran
(74) *Attorney, Agent, or Firm* — Steven Thiel; Campbell C. Chiang

(57) ABSTRACT

A video decoder performs a sequential error handling process to detect and conceal errors within a corrupted data segment of video data units. The decoder sequentially decodes a current data unit. Upon detecting an error, the decoder sets an error flag and resynchronizes decoding at the start of the next unit. If the error flag is set, the video decoder identifies the end of the corrupted data segment based on the start of the later unit. The decoder conceals data between the start of the current unit and the end of the corrupted data segment. If the error flag is not set, the decoder may decode the remainder of the current unit and proceed to decode the next available unit without performing error handling and concealment for the current unit. The decoder also may address reference unit mismatches caused by lost video data units.

47 Claims, 12 Drawing Sheets

(51) Int. Cl.
    *H04N 19/61*     (2014.01)
    *H04N 19/174*     (2014.01)
    *H04N 19/895*     (2014.01)
    *H04N 19/573*     (2014.01)
    *H04N 19/105*     (2014.01)
    *H04N 19/134*     (2014.01)

(56) References Cited

U.S. PATENT DOCUMENTS

| | | | |
|---|---|---|---|
| 6,304,607 | B1 | 10/2001 | Talluri et al. |
| 6,490,320 | B1 | 12/2002 | Vetro et al. |
| 6,530,055 | B1 | 3/2003 | Fukunaga |
| 6,545,557 | B2 | 4/2003 | Nagata |
| 6,590,882 | B1 | 7/2003 | Fong et al. |
| 6,754,277 | B1 | 6/2004 | Heinzelman et al. |
| 6,768,775 | B1 | 7/2004 | Wen et al. |
| 7,027,515 | B2 | 4/2006 | Lin |
| 7,027,517 | B1 | 4/2006 | Nagai et al. |
| 7,124,429 | B2 | 10/2006 | Nagai et al. |
| 7,133,451 | B2 | 11/2006 | Kim et al. |
| 7,173,946 | B2 | 2/2007 | Park et al. |
| 7,194,000 | B2 | 3/2007 | Balachandran et al. |
| 7,340,667 | B2 | 3/2008 | Saado et al. |
| 7,428,684 | B2 * | 9/2008 | Homm et al. ............ 714/747 |
| 8,358,704 | B2 | 1/2013 | Shi et al. |
| 8,379,733 | B2 | 2/2013 | Lee et al. |
| 2003/0014705 | A1 | 1/2003 | Suzuki et al. |
| 2003/0157927 | A1 | 8/2003 | Yi et al. |
| 2004/0199850 | A1 | 10/2004 | Yi et al. |
| 2005/0195903 | A1 | 9/2005 | Karandikar et al. |
| 2005/0259613 | A1 | 11/2005 | Garudadri et al. |
| 2006/0039483 | A1 | 2/2006 | Lee et al. |
| 2006/0062312 | A1 * | 3/2006 | Lee et al. ............ 375/240.27 |
| 2007/0009037 | A1 | 1/2007 | Yamaguchi et al. |
| 2008/0232478 | A1 * | 9/2008 | Teng et al. ............ 375/240.27 |

FOREIGN PATENT DOCUMENTS

| | | |
|---|---|---|
| JP | 06070306 | 3/1994 |
| JP | 9200743 A | 7/1997 |
| JP | 2000078197 | 3/2000 |
| JP | 2000175189 A | 6/2000 |
| JP | 2000307672 | 11/2000 |
| JP | 2003078565 | 3/2003 |
| JP | 2004056169 | 2/2004 |
| JP | 2005295054 A | 10/2005 |
| JP | 2006339880 A | 12/2006 |
| JP | 2007019979 A | 1/2007 |
| TW | 200402035 A | 2/2004 |
| WO | WO0160011 A2 | 8/2001 |
| WO | WO03041326 | 5/2003 |
| WO | 2008063687 A2 | 5/2008 |

OTHER PUBLICATIONS

Hua Yang et al: "Mismatch Impact on Per-Pixel End-to-End Distortion Estimation and Coding Mode Selection", IEEE International Conference on Multimedia AD Expo, 2007, IEEE, Jul. 1, 2007, pp. 2178-2181, XP031124091 ISBN:978-1-4244-1016-3.*

Gennari, et al., H-264 Robust Decoder for Wireless Environments (12 pages).

Superiori, et al., Performance of a H-264/AVC Error Detection Algorithm Based on Syntax Analysis (2005) (17 pages).

"Description of Core Experiments on Error Resilience in MPEG-4 Video," Joint Video Team of ISO-IEC MPEG & ITU-T VCEG (ISO/IEC JTC1/SC29/WG11 and ITU-T SG16 Q6) No. N1646, Apr. 11, 1997, Sections 1.2, 5.3.1, 5.3.2.3, Sections 5.6 E10 and 5.7 E.11, XP030010413.

Hua Yang et al: "Mismatch Impact on Per-Pixel End-to-End Distortion Estimation and Coding Mode Selection", IEEE International Conference on Multimedia and Expo, 2007 , IEEE, Jul. 1, 2007, pp. 2178-2181, XP031124091 ISBN: 978-1-4244-1016-3.

International Search Report & Written Opinion—PCT/US2009/034948—International Search Authority—European Patent Office, Aug. 12, 2009.

Xiaowei Ding et al: "A novel bitstream level joint channel error concealment scheme for realtime video over wireless networks", Twenty-Third Annual Joint Conference of the IEEE Computer and Communications Societies, (INFOCOM 2004) IEEE, Piscataway, NJ, USA, vol. 3, Mar. 7, 2004, pp. 2163-2173, XP010740571 ISBN: 978-0-7803-8355-5.

Yao Wang et al: "Error Resilient Video Coding Techniques—Real-Time Video Communications over Unreliable Networks," IEEE Signal Processing Magazine.

Chang, Y. C. et al. "Performance Evaluation of MPEG-4 Visual Error Resilient Tools Over a Mobile Channel". IEEE Transactions on Consumer Electronics, vol. 49, No. 1, Feb. 2003.

Garudadri H: "Video Quality Evaluation Procedure" TSG-C WG1.2 Conference Call, C12, Online Nov. 20, 2003, XP002358370.

Garudadri: "Video Delivery in cdma2000 Networks" TSG-C SWG1.2 AD HOC, Montreal Quebec, Online! May 17, 2004, XP002358369.

Hagenauer, et al.; "Error Robust Multiplexing for Multimedia Applications"; Signal Processing: Image Communication 14; Elsevier Science B.V.; 1999; pp. 585-597.

Liang, et al.; "Tools for Robust Image and Video Coding in JPEG2000 and MPEG4 Standards"; IS&T/SPIE onference on Visual Communications and Image Processing; Jan. 1999; pp. 40-51.

Masala, E. et al.: "Rate-Distortion Optimized Slicing, Packetization and Coding for Error Resilient Video Transmission," Proceedings of the Data Compression Conference (DCC 2004), (Mar. 23-24, 2004), pp. 182-191.

Talluri, Raj; "Error-Resilient Video Coding in the ISO MPEG-4 Standard"; IEEE Jun. 1998; pp. 112-119.

Yao Wang et al: "Error Resilient Video Coding Techniques—Real-Time Video Communications over Unreliable Networks," IEEE Signal Processing Magazine, IEEE Service Center, Piscataway, NJ, US, vol. 17, No. 4, Jul. 1, 2000, pp. 61- 82, XP11089872.

Hourunranta, A. J., "Video error resilience in 3G-324M videophones," in Proc. Intl. Conference on InformationSystem, Analysis and Synthesis, vol. 4, 2001.

Wegner S., "H.264/AVC over IP" IEEE Transactions on Circuits and Systems for Video Technology, vol. 13, No. 7, pp. 645-656, Jul. 2003.

* cited by examiner

VIDEO DECODER ERROR HANDLING

This application claims the benefit of U.S. provisional application No. 61/031,438, filed Feb. 26, 2008, the entire content of which is incorporated herein by reference.

TECHNICAL FIELD

The disclosure relates to digital video decoding and, more particularly, techniques for handling video decoding errors.

BACKGROUND

A number of video encoding and decoding techniques have been developed for encoding and decoding digital video data. The Moving Picture Experts Group (MPEG), for example, has developed several techniques including MPEG-1, MPEG-2 and MPEG-4. Other examples include the International Telecommunication Union (ITU)-T H.263 standard, and the ITU-T H.264 standard and its counterpart, ISO/IEC MPEG-4, Part 10, i.e., Advanced Video Coding (AVC). These video standards support efficient transmission and storage of video data by encoding data in a compressed manner to reduce the amount of data.

A source device may employ one of the above video encoding techniques to encode the digital video data. The source device archives the encoded video data and/or transmits the encoded video data to a destination device via a transmission channel. The destination device receives the encoded video data and decodes the received video data to recover the original digital video data for playback. Video data may be lost or corrupted during transmission over error-prone channels, resulting in decoding errors. Error robustness is important for various applications, such as video broadcasting and video telephony.

A video decoder should detect errors in received bitstreams to support stable video decoding. In addition, a video decoder also should perform error handling to reduce the impact of errors on quality. When a decoding error is detected, a video decoder may conceal corrupted data until decoding synchronization can be reestablished. Without proper error handling, a decoder may drop correct data or display unreliable reconstructed data, each of which can degrade visual quality. However, error handling can be computationally intensive and consume excessive power, particularly when implemented in hardware.

SUMMARY

This disclosure relates to techniques for efficiently handling decoding errors that occur when decoding digitally encoded video data. The video data may be organized into video data units, such as frames or slices. The video data units may have variable sizes, and may include video blocks, such as macroblocks or smaller blocks. A video decoder may perform a sequential error handling process to detect and conceal errors within a corrupted data segment of one or more video data units.

The decoder sequentially decodes a current video data unit, such as a frame or slice, from the start of the video data unit. Upon detecting an error in the current video data unit, the decoder may set an error flag and resynchronize decoding at the start of a next available video data unit in the bitstream. The error flag indicates that at least some of the decoded data in the current data unit produced a decoding error and is corrupted. If the error flag is set, the video decoder identifies the end of the corrupted data segment based on the start of the later video data unit.

The decoder conceals data between the start of the current video data unit and the end of the corrupted data segment. In this manner, the decoder may avoid loss of correct data and display of erroneous data. If the error flag is not set, indicating no error, the decoder may decode the remainder of the current video data unit and proceed to decode the next available video data unit without performing error handling and concealment for the current video data unit. The decoder also may address reference unit mismatches caused by lost video data units, such as lost video frames.

In one aspect, the disclosure provides a video decoding method comprising determining a start of a current unit of encoded video data, decoding at least a portion of the current unit, detecting a decoding error in the current unit, determining a start of a next available unit of the encoded video data, if the decoding error is detected, determining an end of a corrupted data segment based on the start of the next available unit, and concealing the corrupted data segment based on the start of the current unit and the end of the corrupted data segment.

In another aspect, the disclosure provides a video decoding device comprising a decoding engine that decodes at least a portion of a current unit of encoded video data, an error detection module that detects a decoding error in the current unit, an error mapping module that determines a start of the current unit, determines a start of a next available unit of the encoded video data and, if the decoding error is detected, determines an end of a corrupted data segment based on the start of the next available unit, and an error concealment module that conceals the corrupted data segment based on the start of the current unit and the end of the corrupted data segment.

In an additional aspect, the disclosure provides a computer-readable medium comprising instructions to cause one or more processors to determine a start of a current unit of encoded video data, decode at least a portion of the current unit, detect a decoding error in the current unit, determine a start of a next available unit of the encoded video data, if the decoding error is detected, determine an end of a corrupted data segment based on the start of the next available unit, and conceal the corrupted data segment based on the start of the current unit and the end of the corrupted data segment.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
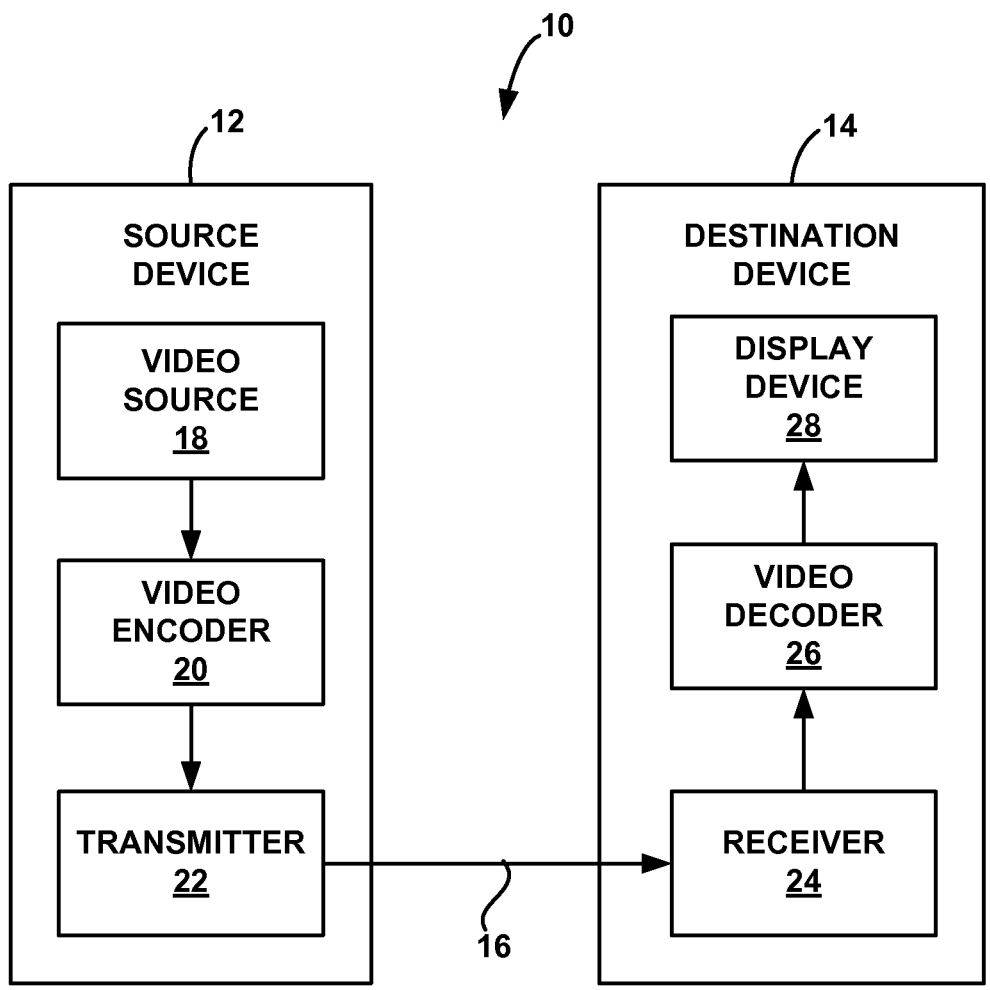
FIG. 1 is a block diagram illustrating a video encoding and decoding system that performs error handling and concealment techniques as described in this disclosure.

This disclosure is directed to sequential error handling techniques for efficiently handling decoding errors that occur when decoding video data. The sequential error handling techniques support error concealment, but do not require a look-ahead operation to identify data to be concealed. In some aspects of this disclosure, sequential error handling techniques may reduce implementation complexity, reduce buffer-size requirements in a decoder, and promote efficient power consumption, especially when implemented in embedded systems such as mobile devices. In addition, in some aspects, sequential error handling techniques may be effective in maintaining or enhancing visual quality of the video.

Error handling may involve identifying video data to be concealed when a video decoding error is detected in order to suppress the effects of the decoding error. For example, a video decoder may conceal video data, such as macroblocks (MBs), within one or more video data units, such as one or more frames or slices. For purposes of illustration, this disclosure will generally refer to video units in the form of video slices and blocks in the form of MBs. However, the disclosure may be readily applicable to other types of video data units and blocks. A video sequence includes multiple video frames. Each frame may include multiple video slices. Each video slice may include a slice header with a resynchronization codeword that permits resynchronization of the decoding process.

Error concealment may involve substituting other data for blocks within a video slice. Any of a variety of concealment techniques may be used. In general, a video decoder may conceal corrupted data by replacing the data with similar data from another video data unit. As an example, a video decoder may conceal MBs in a slice by replacing the MBs with other MBs from a slice in a different frame. In particular, MBs in one slice may be replaced by spatially co-located MBs from a corresponding slice in a temporally adjacent frame in the video sequence.

This disclosure generally describes sequential error handling techniques that may be simple and power-efficient, while providing acceptable visual quality. Error handling is different from error concealment in the sense that error concealment generally requires knowledge of the number of MBs to be concealed, and error handling provides such information. This information may be referred to as an error range. The particular error concealment techniques used in conjunction with the disclosed error handling techniques may be varied. However, error concealment will be described in conjunction with the error range produced by a sequential error handling technique.

In operation, a video decoder may not know the exact position of a decoding error, and may not detect the decoding error immediately. Consequently, MBs that reside between two slice headers may be subject to being unreliably decoded. To avoid presentation of erroneously decoded MBs, which could be visually disconcerting, a video decoder may be designed to conceal all MBs between two slice headers when a decoding error is detected. In this manner, the video decoder may conceal all possibly corrupted MBs. The slice headers may be consecutive if an error is located within one slice or non-consecutive in the event an error spans multiple slices.

To determine which MBs and how many MBs to conceal, the error handling operation of the decoder may determine all MBs extending between the start of the current slice in which a decoding error was detected and either the next resynchronization codeword of a later slice or the end of the frame, whichever follows next in the bitstream. In other words, the error handling operation may identify the first MB in the current slice and the last MB just prior to either the next slice or the end of the video frame. This information then may be passed to the error concealment operation.

MBs in a frame are numbered. The last MB occurs just prior to the first MB of the next slice. Because the size of a video unit such as a slice is variable, the number of the first MB in a later slice is not readily known. One approach for identifying the first MB in the later slice is to look ahead in the bitstream and search for a resynchronization codeword associated with the next slice header before completing the decoding of the current slice. By pre-decoding the next slice header, and identifying the resynchronization codeword, a look-ahead operation can determine the first MB of the next slice and, hence, the last MB of the preceding slice. In this manner, the first and last MBs are available in the event an error is detected. The first and last MBs define a data segment for concealment. The data segment may contain one slice or multiple slices.

When a frame is divided into several slices, a decoder usually decodes one slice at a time, instead of one frame at a time. Ideally, a decoder may apply a look-ahead operation to seek the next slice header to determine the number of MBs that it needs to decode for the current slice. The decoder needs to know the first MB and last MB of the corrupted data segment so that, when an error is found during decoding, an error handler can provide these numbers for error concealment. In this manner, the decoder only conceals the MBs within the corrupted data segment and resumes decoding from the next slice header. With the help of a slice structure, the decoder can reconstruct more MBs instead of losing an entire frame.

A look-ahead approach may be effective in some software-based decoder implementations, but can be highly undesirable for embedded hardware decoder architectures. In many cases, a look-ahead operation can substantially increase hardware complexity, and require more computations and interruptions between processors, degrading power efficiency. In addition, a look-ahead operation may require excessive buffering so that the decoding process can revert to the current slice after looking ahead to the next slice. The look-ahead operation occurs before a current slice is decoded and, therefore, is performed whether a decoded error is detected or not. Consequently, each slice must be buffered and then decoded. This look-ahead operation is applied for all slices in the bitstream even if the bitstream contains no errors, requiring complex computations that are wasted for most slices.

With a sequential error handling process, as described in this disclosure, a video decoder does not need to look ahead to identify the start of a later slice. Instead, a video decoder decodes the current slice sequentially, until an error is detected, before proceeding to a later slice. Rather than looking ahead in the bitstream before decoding, the video decoder may decode the entire current slice, if no error is detected, without first identifying the start of the later slice.

In this manner, the video decoder may delay error concealment operations until the slice header of the next slice being decoded is obtained. The decoder does not need to know the last MB number of the corrupted data prior to decoding the current slice, but maintains an error flag that indicates whether a decoding error occurred in that slice. Hence, in effect, the decoder may initially assume that the current slice contains no error. If it does have errors, an error handler associated with the decoder can process the error at a later time after the next slice header is decoded. This concept is contrary to the typical look-ahead approach, which would assume that every slice may have an error.

In a sequential error handling process, in accordance with this disclosure, upon detecting an error during decoding of the current slice, the video decoder sets the error flag and reestablishes decoding synchronization at the start of a later video slice, e.g., by seeking and identifying a resynchronization codeword at the start of the later video slice. The later slice may be the very next slice that immediately follows the current slice. Alternatively, if the decoding error resulted in the loss or corruption of multiple video slices, or portions of multiple slices, the later slice may not be the very next slice following the current slice. In some instances, the next available slice may not even reside in the same frame as the current slice being decoded.

Upon decoding the current video unit or detecting a decoding error, the video decoder proceeds to the next available, i.e., later, slice. If the error flag was set, indicating that an error was detected, the decoder determines the end of the corrupted data segment based on the start of the later slice. The end of the corrupted data segment may correspond to the end of the current slice if only one slice was corrupted. Alternatively, the end of the corrupted data segment may correspond to the end of a later video slice if more than one video slice was corrupted.

Upon performing error handling to identify the start of the current video slice and the end of the corrupted data segment, the video decoder may perform error concealment. For example, the video decoder may conceal data between the start of the current slice and the end of the corrupted data segment. The corrupted data segment ends just prior to the next available slice header. By concealing the corrupted data, the video decoder may avoid loss of correct data and/or display of erroneous data. If the error flag is not set, indicating that an error was not detected in the current slice, the video decoder can simply proceed to decode the next available video slice without performing error concealment for the current slice.

A sequential error handling technique, in accordance with various aspects of this disclosure, may support decoding and error handling without the need for a look-ahead operation. Elimination of the look-ahead operation enables sequential error handling, which may require less buffer space, computations and power resources. For example, the bitstream may be decoded sequentially, instead of buffered to support a first pass for look-ahead followed by a second pass for subsequent decoding.

In general, a look-ahead operation attempts to identify the extent of a potential decoding error as part of an error handling operation regardless of whether a decoding error is actually present in the video sequence or not. A sequential error handling technique decodes a video data unit sequentially and invokes error handling if a decoding error is detected. If an error is not detected, video decoding may proceed without error handling and error concealment, and therefore may support a more efficient decoding process.

FIG. 1 is a block diagram illustrating a video encoding and decoding system that performs error handling and concealment techniques as described in this disclosure. As shown in FIG. 1, system 10 includes a source device 12 that transmits encoded video data to a destination device 14 via a communication channel 16. Communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting encoded video data from source device 12 to destination device 14.

Source device 12 generates coded video data for transmission to destination device 14. Source device 12 may include a video source 18, a video encoder 20, and a transmitter 22. Video source 18 of source device 12 may include a video capture device, such as a video camera, a video archive containing previously captured video, or a video feed from a video content provider. As a further alternative, video source 18 may generate computer graphics-based data as the source video, or a combination of live or archived video and computer generated video. In some cases, if video source 18 is a video camera, source device 12 may form a so-called camera phone or video phone, or any other type of camera-equipped computing or communication device, including mobile telephones or other devices. In other aspects, video source 18 may be coupled to or integrated with a source device 12. In each case, the captured, pre-captured, and/or computer-generated video may be encoded by video encoder 20 for transmission from source device 12 to destination device 14 via transmitter 22 and communication channel 16.

Video encoder 20 receives video data from video source 18. The video data received from video source 18 may be arranged in a video sequence comprising a series of video data units, such as video frames. Some or all of the frames may be divided into smaller video data units, such as video slices. Video encoder 20 may operate on blocks of pixels (referred to herein as video blocks) within individual video frames or slices in order to encode the video data. A frame or slice may contain multiple video blocks. The video blocks may have fixed or varying sizes, and may differ in size according to a specified coding standard. A 16×16 pixel video block, commonly referred to as a macroblock (MB), may be arranged into sub-blocks.

As an example, the International Telecommunication Union Standardization Sector (ITU-T) H.264/MPEG-4, Part 10, Advanced Video Coding (AVC) (hereinafter "H.264/MPEG-4 AVC" standard) supports intra prediction in various block sizes, such as 16×16, 8×8, or 4×4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In general, MBs and the various sub-blocks may be considered to be video blocks. Thus, MBs may be considered to be video blocks, and if partitioned or sub-partitioned, MBs can themselves be considered to define sets of video blocks. In some aspects, error handling techniques may direct error concealment based on MB numbers within a slice or frame. In other aspects, however, error handling techniques may process larger or smaller video block sizes.

While the techniques are described in this disclosure with respect to a variety of video data units, such as video frames or video slices, the techniques may be equally applicable to any encoding and decoding of video data. Moreover, the techniques are described in this disclosure with respect to video data encoded and decoded according to the H.264/MPEG-4 AVC standard. However, the techniques are described in reference to this standard for purposes of illustration. Such techniques may be readily applied to any of a variety of other video coding standards, such as those defined by the Moving Picture Experts Group (MPEG) in MPEG-1, MPEG-2 and MPEG-4, the ITU-T H.263 standard, the Society of Motion Picture and Television Engineers (SMPTE) 421M video CODEC standard (commonly referred to as "VC-1"), the standard defined by the Audio Video Coding Standard Workgroup of China (commonly referred to as "AVC"), as well as any other video coding standard defined by a standards body or developed by an organization as a proprietary standard.

For purposes of illustration, and without limitation, application of sequential error handling will be described with reference to H.264/MPEG-4 AVC coding. Video encoder 20 may encode each block (e.g., a macroblock (MB)) according to intra-coding and inter-coding prediction schemes, e.g., as set forth in the H.264/MPEG-4 AVC standard. Following intra- or inter-based prediction of the video blocks, video encoder 20 may perform a number of other operations on the video blocks in accordance with the above H.264/MPEG-4 AVC standard. These additional operations may include transformation operations (such as 4×4 or 8×8 integer transform used in H.264/AVC or a discrete cosine transformation DCT) to produce transform coefficients, quantization operations, and entropy coding operations. The encoded data may form part of an encoded video data bitstream. The encoded frames may contain one or more slices. Each slice may be designated by a header, such as a Network Abstraction Layer (NAL) unit header, which may include one or more codewords for synchronizing and/or re-synchronizing the decoding process. Each slice may include one or more blocks, such as MBs and smaller blocks.

A slice may include blocks selected in accordance with a wide variety of patterns. For example, the slice may include blocks arranged sequentially in a given number of rows of a frame. The slices may alternatively include a number of blocks arranged sequentially in a row, where the slice may adapt to the video data by defining a certain run length of sequentially row-ordered blocks. As another example, the slice may include blocks arranged in a given number of columns of a frame or a run-length of sequentially arranged column-ordered blocks. A slice may, therefore, include any number of blocks, such as a fixed or static number, but may include more or less blocks than a subsequent or previous slice so as to adapt to accommodate different video data.

After encoding the slices, video encoder 20 may designate each slice of a frame as a unit, such as network abstraction layer (NAL) unit defined by the H.264/MPEG-4 AVC standard, and encode each slice with a corresponding slice or resynchronization header, such as a NAL unit header as defined by the H.264/MPEG-4 AVC, to mark the beginning of each unit, as mentioned above. Encoding video data in this manner provides the opportunity for frequent resynchronization, which may substantially reduce the impact of video data lost or corrupted during transmission and improve decoding by reducing the propagation of errors resulting from the lost video data.

For example, by splitting a frame into slices, a slice or a portion thereof may be encoded within a single packet for transmission over channel 16. If that slice is lost or corrupted during transmission over channel 16, the slice may be reconstructed or replaced without having to replace, reconstruct or otherwise conceal an entire frame, as might be necessary if the entire frame were encoded in the packet. Moreover, the slice or resynchronization header may eliminate the propagation of errors, as each resynchronization header may be used to restart the decoding process such that decoding no longer relies on past, possibly corrupted data. Thus, source device 12 may transmit the encoded video data to destination device 14 via transmitter 22 as a plurality of packets, where each packet may encode a separate slice to support efficient handling of decoding errors.

Receiver 24 receives the encoded video data from source device 12 via channel 16. Destination device 14 may include a receiver 24, video decoder 26, and display device 28. Video decoder 26 may decode the encoded video data to obtain the original video data for playback on display device 28. Display device 28 may comprise any of a variety of display devices such as a cathode ray tube (CRT), a liquid crystal display (LCD), a plasma display, a light emitting diode (LED) display, an organic LED display, or another type of display unit.

As described above, during transmission of the encoded video data via channel 16, various slices or MBs of the encoded video data may be lost or corrupted due to, for example, interference, congestion, or other anomalies that impact signal propagation along channel 16. For wireless applications, the lost or corrupted video data may arise due to wireless transmission over an error-prone network. Decoding errors may adversely impact a variety of applications, such as video broadcasting or video telephony. Receiver 24 receives the encoded video data, which may include lost or corrupted video data. Video decoder 26 may attempt to decode these lost or corrupted data, which may span a portion of a frame or slice, or multiple frames or slices. These lost or corrupted data may produce decoding errors that may result in loss of correct data and/or presentation of erroneous data.

Video decoder 26 may be configured to perform a sequential error handling operation and an error concealment operation. In the error handling operation, video decoder 26 detects a decoding error and determines the general extent of the data corrupted by the error, which may be referred to as a corrupted data segment. A corrupted data segment may generally refer to a segment of data in the received bitstream that is lost, corrupted, or otherwise erroneous in some significant respect relative to the data in the originally encoded bitstream. If an error is detected in a slice, all MBs in the slice preferably are concealed. However, it is necessary to determine the first and last MBs affected by the decoding error. The first MB of a current slice can be readily determined at the start of decoding the slice. Due to the variable size of the slice, however, the last MB of the slice is not readily known. Moreover, if the decoding error spans multiple slices, the last MB in the corrupted data segment to be concealed may reside within a later slice. In other words, the corrupted data segment may include one slice or multiple slices.

In either case, the last MB to be concealed may be identified by detecting the first MB of the next available slice that is properly received, e.g., based on detection of the next resynchronization marker associated in a header associated with the slice. Then, the last MB of the potentially corrupted data may be identified as the MB just prior to the first MB of the next available slice. A sequential error handling technique as described in this disclosure may permit identification of the MBs to be concealed without the need for a look-ahead operation. In this manner, a sequential error handling technique may enhance the efficiency of the error handling and concealment operations performed by video decoder 26.

In general, instead of buffering and looking ahead to the next slice, video decoder 26 may first determine a start of the current slice of encoded video data and begin decoding the current slice. When a decoding error is detected, video decoder 26 may proceed to resynchronize decoding by determining a start of the next available slice of received video data. For example, in response to the decoding error, video decoder 26 may stop decoding the current slice and proceed to decode the next available slice that can be identified by parsing the bitstream. The next available slice is a later slice in the bitstream. Based on the start of the later slice, video decoder 26 may determine the end of the corrupted data segment, which may be the end of the current slice or the end of another slice that resides between the current slice and the next available slice. Considering that video decoder 26 has identified the slice that includes the detected error, video decoder 26 may conceal the error in the corrupted data segment based on the start of the current slice and the start of the next available slice.

As an illustration, video decoder 26 may receive a frame and determine the start of the first slice of the frame. The start of the first slice may include the MB number of the first slice, e.g., MB number zero if the slice is the first slice in the frame. Video decoder 26 may next decode the first slice without determining the last MB of the first slice and without even accessing a second slice or slice header, contrary to the look-ahead approach. In this manner, video decoder 26 may eliminate the additional buffer that otherwise would be needed to look ahead to the next slice and then revert to the current slice for decoding.

Upon detecting an error in the first slice, video decoder 26 may set an error flag to indicate a decoding error occurred. The error flag may take any of a variety of forms such as a single bit that is set and reset to indicate an error or no error, respectively, or other types of error indicators, messages, commands, bit patterns, codewords, or the like, which may be stored in memory or a register associated with the decoder. Upon detection of an error, video decoder 26 may proceed to re-synchronize the decoding process by determining the start of the next available slice, e.g., by reference to the next slice header that can be found in the bitstream. Again, this next available slice may not be the very next slice in the encoded bitstream, but instead is the next slice in the received bitstream. Hence, the next available slice could be a third, fourth or fifth (or later) slice in the bitstream as a result of multiple slice losses. Moreover, as further described below, the next available slice may not even be included within the same frame as the first slice. Sequential error handling techniques may be applied, however, in each of these instances to efficiently handle decoding errors spanning a single slice, multiple slices, or even multiple frames.

Regardless of how many slices or frames the decoding error spans, video decoder 26 determines, based on the start of the next available slice, the end of the corrupted data segment that includes the decoding error. As an illustration, upon decoding a first slice, video decoder 26 may determine the start of the first slice as MB number zero (0), detect a decoding error, and then seek the start of the next available slice at MB number N. This assumes that the corrupted data segment spans one or more slices but resides within a single frame. Based on MB number N, video decoder 26 may determine that the end of the corrupted data segment that includes the decoding error is MB number N−1. If the first MB number in the second slice is 55, for example, then the MB number of the last MB in the corrupted data segment would be 54. With this determination, the error handling operation of video decoder 26 may indicate that a corrupted data segment extending from MB 0 to MB 54 should be concealed.

Video decoder 26 may conceal errors according to any number of concealment techniques. Video decoder 26 may conceal errors, for example, by replacing MB numbers 0 to 54 with MB numbers 0 to 54 from an adjacent frame, such as a previously decoded frame. Alternatively, video decoder 26 may employ more sophisticated techniques, such as interpolation, extrapolation, or motion compensated interpolation, to replace the MBs that are potentially impacted by the decoding error. Upon decoding the slice and performing error concealment, if necessary, video decoder 26 may forward the decoded video data to display device 28 for presentation to a user.

As a result of avoiding the look-ahead operation, video decoder 26 may proceed to sequentially decode the bitstream without the need to buffer portions of the bitstream for frequent look-ahead operations. Moreover, video decoder 26 may invoke error handling operations when needed to support concealment of actual errors, rather than continuously performing look-ahead operations whether errors are present or not. In many applications, errors may occur for only a small percentage of video slices. By applying error handling on-demand, rather than continuously, and thereby avoiding continuous look-ahead buffering, video decoder 26 may consume less computational and power resources, and present reduce computational complexity for implementation. Power conservation may be especially important when video decoder 26 forms part of an embedded system with limited power resources, such as a mobile wireless communication device.

Further details of possible implementations of system 10 will now be described. In some cases, source device 12 and destination device 14 may operate in a substantially symmetrical manner. For example, source device 12 and destination device 14 may each include video encoding and decoding components. Hence, system 10 may support one-way or two-way video transmission between devices 12, 14, e.g., for video streaming, video broadcasting, or video telephony. The sequential error handling techniques described herein may be applicable to devices that include both encoding and decoding components, e.g., in a combined CODEC. In addition, in some aspects, the error handling techniques may be applied within a decoder that resides in the same device in which an encoder that encoded the data to be decoded resides. In this case, for example, encoded data may be archived locally and then decoded for local playback, rather than transmitted to another device such as destination device 14. Error handling techniques, in this example, may be applied to encoded video data that is corrupted in video data write and read operations with respect to a data storage medium, or corrupted due to other factors.

As described previously, video encoder 20 and video decoder 26 may operate according to a video compression standard, such as Moving Picture Experts Group (MPEG)-2, MPEG-4, ITU-T H.263, or H.264/MPEG-4 AVC. Although not shown in FIG. 1, in some aspects, video encoder 20 and video decoder 26 may each be integrated with an audio encoder and decoder, respectively, and may include appropriate MUX-DEMUX units, or other hardware and software, to handle encoding of both audio and video in a common data stream or separate data streams. In this manner, source device 12 and destination device 14 may operate on multimedia data including audio and video data. If applicable, the MUX-DEMUX units may conform to the ITU H.223 multiplexer protocol, or other protocols such as the user datagram protocol (UDP).

The H.264/MPEG-4 AVC standard was formulated by the ITU-T Video Coding Experts Group (VCEG) together with the ISO/IEC MPEG as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification.

In some cases, video encoder 20 and video decoder 26 may be configured to support scalable video coding (SVC) for spatial, temporal and/or signal-to-noise ratio (SNR) scalability. Video encoder 20 and video decoder 26 may be configured, in some aspects, to support fine granularity SNR scalability (FGS) coding for SVC. Video encoder 20 and video decoder 26 may support various degrees of scalability by supporting encoding, transmission and decoding of a base layer and one or more scalable enhancement layers. For scalable video coding, a base layer carries video data with a baseline level of quality. One or more enhancement layers carry additional data to support higher spatial, temporal and/or SNR levels.

A base layer may be transmitted in a manner that is more reliable than the transmission of enhancement layers. For example, the most reliable portions of a modulated signal may be used to transmit the base layer, while less reliable portions of the modulated signal may be used to transmit the enhancement layers. The base and enhancement layers are encoded using hierarchical modulation on the physical layer such that the base layer and enhancement layer can be transmitted on the same carrier or subcarriers but with different transmission characteristics resulting in different packet error rate (PER).

In some aspects, for video broadcasting, the techniques described in this disclosure also may be applied to Enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," published in July 2007 as Technical Standard TIA-1099 (the "FLO Specification"). For example, channel 16 may comprise a wireless information channel used to broadcast wireless video information according to the FLO Specification, or the like. The FLO Specification includes examples defining bitstream syntax and semantics and decoding processes suitable for the FLO Air Interface.

Alternatively, video may be broadcasted according to other standards such as DVB-H (digital video broadcast-handheld), ISDB-T (integrated services digital broadcast-terrestrial), or DMB (digital media broadcast). Hence, in various aspects, source device 12 may be a mobile wireless terminal, a video streaming server, or a video broadcast server. However, techniques described in this disclosure are not limited to any particular type of broadcast, multicast, or point-to-point system. In the case of video broadcast, source device 12 may broadcast several channels of video data to multiple destination devices, each of which may be similar to destination device 14 of FIG. 1. Thus, although a single destination device 14 is shown in FIG. 1, for video broadcasting, source device 12 may more typically broadcast the video content simultaneously to many destination devices.

Transmitter 22, communication channel 16, and receiver 24 may be configured for communication according to any wired or wireless communication system, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, an orthogonal frequency division multiple (OFDM) access system, a time division multiple access (TDMA) system such as GSM (Global System for Mobile Communication), GPRS (General packet Radio Service), or EDGE (enhanced data GSM environment), a TETRA (Terrestrial Trunked Radio) mobile telephone system, a wideband code division multiple access (WCDMA) system, a high data rate 1xEV-DO (First generation Evolution Data Only) or 1xEV-DO Gold Multicast system, an IEEE 802.18 system, a MediaFLO™ system, a DMB system, a DVB-H system, or another scheme for data communication between two or more devices.

Video encoder 20 and video decoder 26 each may be implemented with one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 26 may be included in one or more encoders or decoders, either of which may be integrated as part of a combined encoder/decoder (CODEC) in a respective mobile device, subscriber device, broadcast device, server, or the like. In addition, source device 12 and destination device 14 each may include appropriate modulation, demodulation, frequency conversion, filtering, and amplifier components for transmission and reception of encoded video, as applicable, including radio frequency (RF) wireless components and antennas sufficient to support wireless communication, if applicable. For ease of illustration, however, such components are generally summarized as being transmitter 22 of source device 12 and receiver 24 of destination device 14 in FIG. 1.

Figure 2:
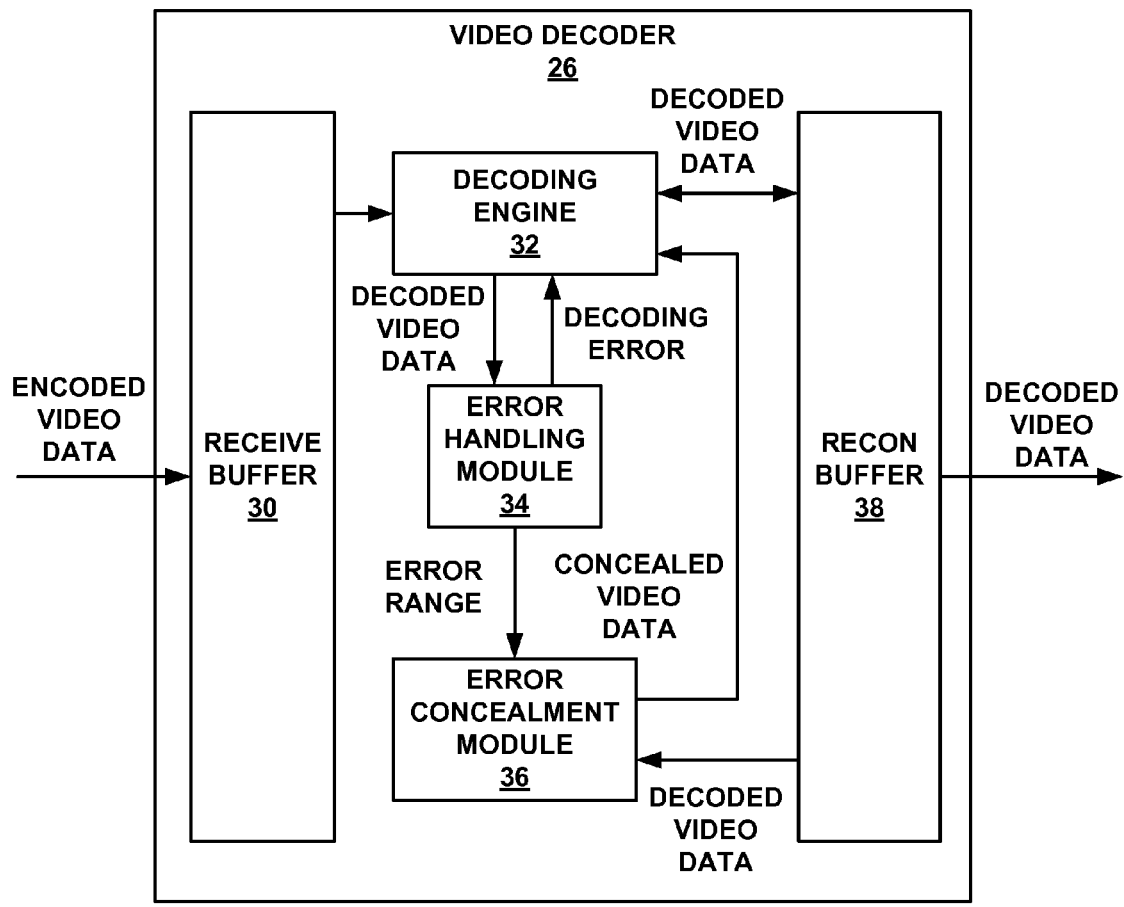
FIG. 2 is a block diagram illustrating an example of a video decoder that performs error handling and concealment techniques as described in this disclosure.

FIG. 2 is a block diagram illustrating an example of a video decoder 26 that performs error handling and concealment techniques as described in this disclosure. Video decoder 26 may correspond to that of destination device 14 of FIG. 1. As shown in the example of FIG. 2, video decoder 26 includes a receive buffer 30, a decoding engine 32, an error handling module 34, an error concealment module 36 and a reconstruction (RECON) buffer 38. In general, receive buffer 30 receives and stores encoded video data, such as data encoded by video encoder 20. Reconstruction buffer 38 stores decoded video data that has been decoded and reconstructed by decoding engine 32. The decoded video data in reconstruction buffer 38 may be used to provide reference frames used by decoding engine 32 in decoding of predictively coded video data obtained from receive buffer 30. In addition, the decoded video data obtained from reconstruction buffer 38 can be used by error concealment module 36 to conceal errors in the decoded video bitstream. The reconstructed data in reconstruction buffer 38 may be provided as decoded video data for any of a variety of post-processing operations. The decoded video data produced by video decoder 26, subject to any applicable post-processing, may be provided to an output buffer for presentation to a user via a display device. Decoding engine 32, error handling module 34 and error concealment module 36 cooperate to produce the decoded video data. Decoding engine 32, error handling module 34 and error concealment module 36 are configured to apply a sequential error handling process as described in this disclosure.

The various components, units or modules included shown in FIGS. 1 and 2, as well as other components described throughout this disclosure, may be realized by any suitable combination of hardware and/or software. In FIGS. 1 and 2, as well as FIG. 3, various components are depicted as separate components, units or modules. However, all or several of the various components described with reference to FIG. 1-3 may be integrated into combined units or modules within common hardware and/or software. Accordingly, the representation of features as components, units or modules is intended to highlight particular functional features for ease of illustration, and does not necessarily require realization of such features by separate hardware or software components.

In some cases, various units may be implemented as programmable processes performed by one or more processors. For example, although various features in this disclosure as discrete modules, units, engines or components, the features may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable storage medium comprising instructions that, when executed, cause one or more processors to perform one or more of the methods described in this disclosure.

With further reference to FIG. 2, receive buffer 30 may be realized by a memory module, such as a dynamic random access memory for storing encoded video data. The encoded video data, as described, may comprise video data units, such as one or more frames or slices. The frames or slices may include blocks, such as MBs and smaller blocks. For purposes of illustration, it is assumed that the encoded video data comprises multiple frames, each frame comprises one or more slices, and each slice comprises multiple MBs.

Decoding engine 32 parses the encoded video data bitstream obtained from receive buffer 30 and decodes the encoded video data. Decoding engine 32 may implement decoding techniques as defined by one of the video coding standards described in this disclosure, or other video coding standard. For purposes of illustration, however, it may be assumed that decoding engine 32 performs the decoding techniques in accordance with the H.264/MPEG-4 AVC standard. Decoding engine 32 may perform bit parsing to parse the incoming bitstream to identify frames, slices, blocks and other units of encoded information to be decoded. In addition, decoding engine 32 may perform reconstruction to decode and reconstruct the video data in the units of encoded information.

Error handling module 34 is configured to handle decoding errors in accordance with a sequential error handling technique as described in this disclosure. In the example of FIG. 2, error handling module 34 may perform both error detection and error handling. In some implementations, however, separate error detection and error handling modules may be provided. In operation, error handling module 34 may detect decoding errors in the decoded video data produced by decoding engine 32, and identify a range of data such as MBs that should be concealed in order to avoid loss of correct data or display or erroneous data.

Error concealment module 36 receives a decoding error range (ERROR RANGE) from error handling module 34. The decoding error range may specify which MBs should be concealed by error concealment module 36. For example, error handling module 34 may specify, as the error range, all MBs extending from a first MB 0 of a first slice to a last MB N−1 prior to the starting MB N of the next available slice in the bitstream. Error concealment module 36 may conceal errors in accordance with any of a variety of concealment techniques to replace the identified MBs generated by decoding engine 32 with different MBs. For example, error concealment module 36 may provide concealed video data to decoding engine 32. Error concealment module 36 may include the concealed video data in the decoded video data provided to reconstructions buffer. As an illustration, if error handling module 34 specifies MB 0 to MB 54 as the error range, then error concealment module 36 would conceal MBs 0 to 54 and provide the concealed MBs [0, 54] to decoding engine 32.

Reconstruction buffer 38, similar to receive buffer 30, represents a memory module, such as a dynamic random access memory, that stores decoded video data generated by decoding engine 32. In addition, decoding engine 32 may retrieve decoded video data from reconstruction buffer for use in decoding the encoded video data obtained from receive buffer 26. In particular, decoding engine 32 may use decoded video data from reconstruction buffer 38 as reference frames for decoding of other frames. In some implementations, error concealment module 36 may overwrite specified MBs within reconstruction buffer 38 to conceal decoded MBs when an error is detected. Alternatively, as in the example of FIG. 2, error concealment module 36 may coordinate with decoding engine 32 to conceal the specified MBs before decoding engine 32 transfers the decoded MBs to reconstruction buffer 38. For example, error concealment module 36 may provide concealed video data, such as concealed MBs, to decoding engine 32. Decoding engine 32 then may replace corrupted data with the concealed video data from error concealment module 36 and write the resulting data to reconstruction buffer 38 as decoded video data.

When an error is detected, decoding engine 32 may continue decoding MBs up to the point of the next available slice header, or stop decoding MBs and seek the next available slice header in the bitstream. It may be more efficient to exit the decoding of a current slice when an error is detected, and move to the next slice to be decoded to support error concealment. Then, upon concealing the corrupted data, decoding engine 32 may resume decoding of the next slice as the current slice. Accordingly, error concealment module 36 may be configured to write or overwrite MBs to conceal the corrupted data segments. In either case, the decoded video data stored in reconstruction buffer 38 may include decoded video data that is based on decoded MBs produced by decoding engine 32 and MBs that have been generated or selected by error concealment module 36 to conceal decoding errors.

In operation, receive buffer 30 of video decoder 26 may initially receive encoded video data from a receiver, such as receiver 24 of FIG. 1, and store the encoded video data. Decoding engine 32 may access receive buffer 30 to retrieve a unit of the encoded video data stored in receive buffer 30, such as a slice of a frame. After retrieving a slice, but prior to decoding the slice, decoding engine 32 may first inform error handling module 34 of the start of the slice by transmitting, for example, an MB number associated with the first MB of the current slice to be decoded. This first MB may be referred to as a slice start MB. Error handling module 34 may store the number of the first MB at the start of the slice.

Decoding engine 32 proceeds to decode the MBs in the slice and stores the decoded slice data in reconstruction buffer 38. While decoding the slice, decoding engine 32 may, in addition to storing the decoded slice in reconstruction buffer 38, also output the decoded video data to error handling module 34. In various implementations, error handling module 34 may analyze decoded video data stored in reconstruction buffer 38, decoded video data provided directly from decoding engine, or decoded video data stored in a different buffer. In each case, error handling module 34 may analyze or otherwise inspect the decoded video data to determine whether a decoding error exists in the decoded video data. Hence, error detection capabilities may be provided within error handling module 34. Alternatively, in various implementations, decoding engine 32 or another component within video decoder 26 may include decoding error detection capabilities.

Error handling module 34 may analyze the decoded video data in any number of ways to detect a variety of decoding errors. For example, error handling module 34 may detect syntax errors, semantic errors, and/or other coding errors in the encoded slices received by receive buffer 30 and decoded by decoding engine 32. In general, decoding engine 32 decodes the bitstream using a syntax specified by the applicable coding technique, e.g., such as H.264/MPEG-4 AVC. A syntax error may be detected if the bitstream deviates from an expected bit pattern specified by applicable syntax. A semantic error may be detected when decoding produces incorrect values or operations in video decoder 26, such as out-of-range data, invalid information, or inapplicable commands. A coding error may be detected if an entropy coded value does not match a value or pattern in an applicable coding table, e.g., such as a context-adaptive variable length coding (CAVLC) table. Other types of entropy coding, such as context-adaptive binary arithmetic coding (CABAC), may be used.

Hence, to perform a syntax error check, error handling module 34 may compare a bit pattern of the decoded bitstream to an expected bit pattern specified by applicable syntax. If the bit pattern is inconsistent with the expected bit pattern, error handling module 34 may indicate that a decoding error has been detected. Similarly, to perform a semantic error check, error handling module 34 may analyze the values one or more syntax elements to ensure that these values are valid. For example, error handling module 34 may determine whether the values are consistent with other values, consistent with the currently decoded slice, and/or consistent with previously decoded frames, slices or blocks. If a syntax element value is not within a permitted or expected range of values, error handling module 34 may indicate detection of a decoding error. To detect a coding error, error handling module 34 may compare a decoded codeword to a list of codewords in an applicable entropy coding table, such as a CAVLC or CABAC table. If there is not a match, error handling module 34 may indicate detection of a decoding error.

Upon detecting a decoding error, error handling module 34 may set an error flag in memory associated with video decoder 26 and inform decoding engine 32 of the decoding error. Decoding engine 32, in response to being informed of the detected decoding error, may resynchronize the decoding of the encoded video data stored in receive buffer 30. In particular, decoding engine 32 may stop decoding the current slice and proceed to retrieve the next available slice from the bitstream, e.g., as identified by the next identifiable slice or NAL unit header. The next slice may be referred to as the next "available" slice in the sense that it is the next slice that can be discerned by decoding engine 32 by parsing the bitstream. The decoding error may have propagated across NAL headers and/or frame headers, thereby rendering the differentiation among slices and even frames difficult if not impossible. In other words, a decoding error may result in the loss or corruption of MBs in a single slice, in which case the next resynchronization point may be associated with the very next slice in the received bitstream, or multiple slices, in which case the next resynchronization point may be associated with a later slice in the bitstream. Hence, the next available slice may refer to the next slice in the bitstream that can be readily discernable, e.g., by an identifiable NAL unit header. The NAL header may be referred to as "identifiable" in the sense that it is not corrupted and readily discernable.

When a decoding error is detected, decoding engine 32 may proceed to the next available resynchronization point in the bitstream, as described above, without decoding the remainder of the current slice. Alternatively, decoding engine 32 may continue to decode the bitstream even though the error flag has been set. When the next available slice is obtained, decoding engine 32 may then perform error handling and error concealment. Although decoding engine 32 may be configured to continue decoding the bitstream after an error flag is set, it ordinarily will be more efficient to stop decoding the current slice and instead proceed to the next slice to support error handling and error concealment for the previous slice in which the error was detected. Even if the corrupted data segment is decoded, it will be concealed by error concealment module 36. However, ceasing the decoding operation and proceeding to the next available slice when an error is detected may be more efficient. When a decoding error is not detected, decoding engine 32 proceeds to decode the remainder of the current slice. In either case, when decoding engine 32 arrives at the next resynchronization point, indicating the start of the next available slice, it determines the first MB of that slice. In addition, decoding engine 32 may determine whether error handling module 34 has set the error flag to indicate detection of a decoding error in the previous video slice.

If the error flag is not set, decoding engine 32 stores the first MB of the slice and proceeds to decode that slice. At this point, with the sequential error handling approach, the previous slice has already been decoded, rather than buffered for decoding on a second pass as in the case of the look-ahead approach. If the error flag is set, however, decoding engine 32 invokes error handling and error concealment. Notably, when arriving at the next available slice, decoding engine 32 may not distinguish between proceeding to the slice after detection of a coding error or upon completion of the decoding of the previous slice in the event there is no coding error. Rather, upon arriving at the next available slice, decoding engine 32 and error handling module 34 may inspect the error flag to determine whether to simply continue sequential decoding in the ordinary course, or apply error handling and error concealment. In other words, error handling module 34 may not know whether it has arrived at the next available slice as a result of ordinary error-free decoding or as a result of detection of an error, in which case error handling is needed.

Again, when an error is detected, decoding engine 32 may stop decoding the current slice and retrieve the next available slice. Decoding engine 32 then may inform error handling module 34 of the start of that (next available) slice, e.g., by forwarding a MB number that corresponds to the first MB of the slice. Error handling module 34 may, upon receiving this MB number, determine whether a decoding error has previously occurred by checking whether the error flag is set. If the flag is not set, error handling module 34 may store this first MB number, as described above, e.g., for later use in the event a decoding error is detected in the newly retrieved, next available slice.

However, if the error flag is set, error handling module 34 may determine an end, e.g., the last MB, of the current slice in which the error occurred. For example, error handling module 34 may subtract one from the MB number that corresponds to the first MB of the next available slice. As the decoding error may span multiple slices and even multiple frames, the corrupted data segment likewise may span one or more slices and/or one or more frames. The sequential error handling technique, as described below in more detail, may handle decoding errors that span one or more slices, or one or more frames.

After determining the start and the end of the corrupted data segment in which the error occurred, error handling module 34 may forward this information, which may be referred to as a decoding error range (ERROR RANGE), to error concealment module 36. Based on this decoding error range, error concealment module 36 may conceal the decoding error indicated by the decoding error range by replacing decoded video data stored in reconstruction buffer 38 with previously decoded video data, which may be stored in reconstruction buffer 38. Alternatively, error concealment module 36 may provide the concealed video data to decoding engine 32, which then may handle transfer of decoded data and concealed data to reconstruction buffer 38. In some instances, error concealment module 36 may cache or locally store previously decoded video data, e.g., previously decoded MBs, slices, or frames, for use in concealing the decoding error. As an alternative, to conceal corrupted data, error concealment module 36 may obtain previously decoded video data from reconstruction buffer 38, e.g., as shown in the example of FIG. 2.

Regardless of the manner in which error concealment module 36 accesses the previously decoded video data, error concealment module 36 may replace the decoded video data corresponding to the decoding error range with previously decoded video data in accordance with one of the above listed concealment techniques. If the decoding error range identified by error handling module 34 extends from MB 0 to MB 54, for example, then error concealment module 36 conceals all MBs from MB 0 to MB 54. In this manner, no less than an entire slice is concealed to ensure that all possible corrupt MBs are concealed.

Error concealment module 36 may write the concealed video data directly to reconstruction buffer 38. Alternatively, as shown in FIG. 2, error concealment module 36 may provide the concealed video data to decoding engine 32. Decoding engine 32 then may write properly decoded MBs and concealed MBs, represented by the concealed video data from error concealment module 36, to reconstruction buffer 38. Error concealment module 36 may apply error concealment in the pixel domain, as generally described in this disclosure. In some implementations, error concealment module 36 may apply compression-domain processes for error concealment. For example, error concealment module 36 may be configured to specify encoding modes (e.g., SKIP mode) to conceal corrupted MBs. Accordingly, the techniques described in this disclosure may be used in conjunction with a variety of different error concealment processes, including pixel-domain concealment processes or compression-domain concealment processes.

Once the corrupted MBs are concealed, video decoder 26 may forward the decoded video data via reconstruction buffer 38 to display device 28 for display or playback, as described above, subject to any post-processing operations that may be applied to the decoded video data, e.g., such as sharpening, scaling, or the like. Decoding engine 32 then may proceed to decode the next available slice while applying the same error handling operation as described above. Hence, this error handling process may be applied on a continuous basis as decoding engine 32 traverses subsequent slices and frames in the bitstream. Notably, in various aspects, the error handling process may permit sequential decoding without the need for any look-ahead operations. In this manner, video decoder 26 may promote computational efficiency and power conservation within destination device 14.

Figure 3:
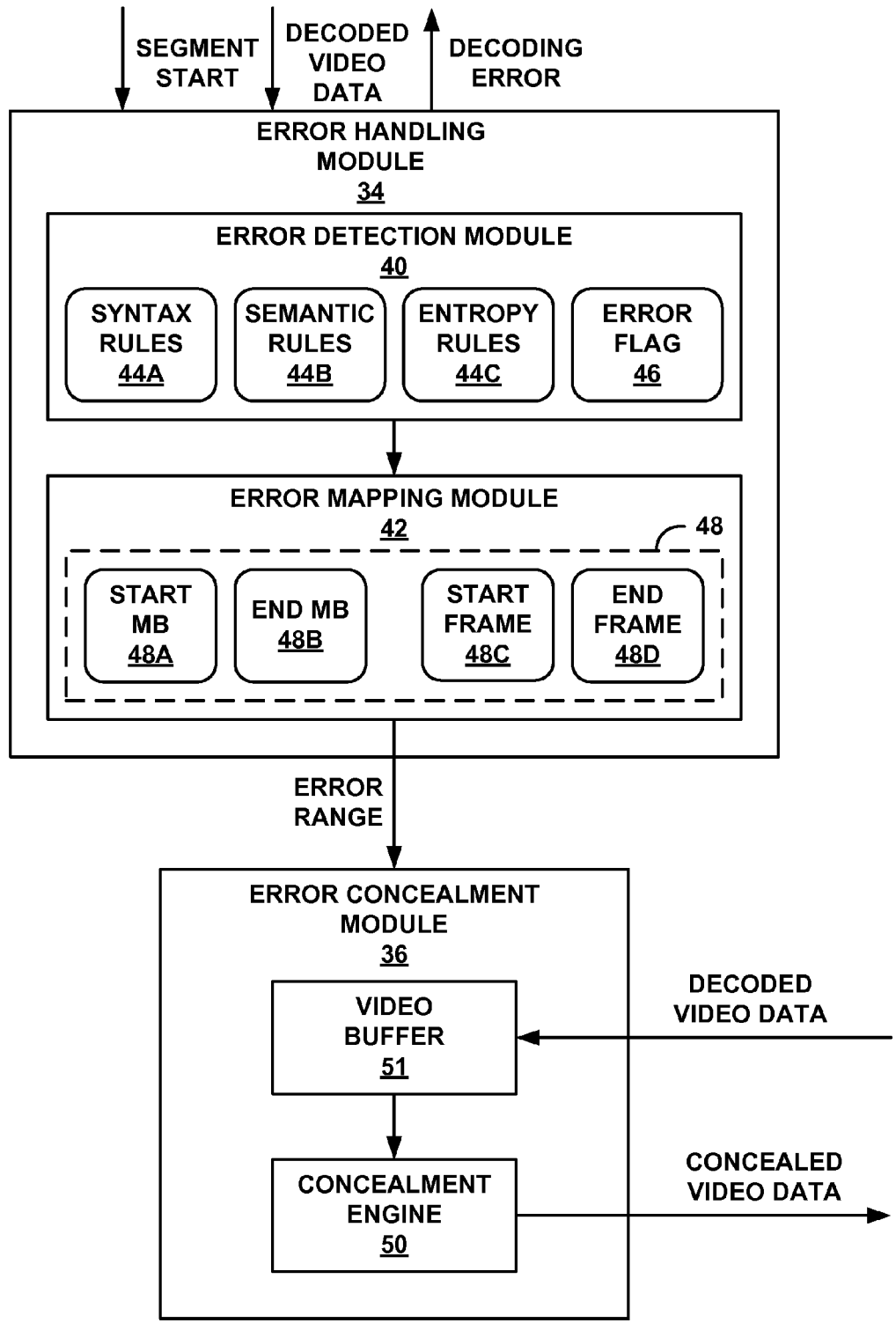
FIG. 3 is a block diagram illustrating example error handling and concealment modules.

FIG. 3 is a block diagram illustrating example error handling and concealment modules 34 and 36 of FIG. 2 in more detail. The example of FIG. 3 is provided for purposes of illustration to highlight various operational aspects of error handling module 34 and error concealment module 36, and should not be considered limiting of the sequential error handling techniques broadly described in this disclosure. In the example of FIG. 3, error handling module 34 may include an error detection module 40 and an error mapping module 42. Error detection module 40 may perform the above described error checks, such as the syntax, semantic error checks, and coding (e.g., CAVLC or CABAC) error checks, in accordance with applicable rules, such as syntax rules 44A, semantic rules 44B and entropy rules 44C. Error detection module 40 further includes and maintains an error flag 46, which represents one example of an error status indicator. Error mapping module 42 maintains a mapping 48 to define a corrupted data segment. Error concealment module 42 may include a concealment engine 50 that performs one or more of the above described concealment techniques, and a video buffer 51 that receives video data for use by concealment engine 50 in concealing corrupted data.

As an example, prior to decoding encoded video data stored in receive buffer 30, decoding engine 32 may transmit a start of slice indication ("slice start") to error handling module 34 for the current slice to be decoded. Error detection module 40 and error handling module 42 may use the slice start to handle errors detected during the decoding operation. A slice start may more generally be referred to as a "segment start," as shown in FIG. 3, inasmuch as the start of the slice may be the start of a larger segment of corrupted data including one or more slices or partial slices.

Again, modules and units are illustrated in FIG. 3 and other figures to highlight various functional aspects of error handling module 34. Accordingly, the precise structural and functional relationship and interaction between error detection module 40, error mapping module 42, or other modules may be subject to variation. Error mapping module 42 may store the segment start, which as described above may comprise a first MB of the current slice to be decoded. MB numbers may be determined from syntax elements in the decoded bitstream. For example, error mapping module 42 may store the first MB as start MB 48A. If the current slice is the first slice in a frame, the first MB may be MB 0. If the current slice is a later slice in the frame, the first MB may have a higher number.

Upon receiving the segment start, error detection module 40 may analyze decoded video data produced by decoding engine 32, which may comprise decoded MBs having syntax elements. Error detection module 40 may perform syntax error, semantic error, and entropy coding error checks on the decoded syntax elements. In particular, error detection module 40 may apply syntax rules 44A, semantic rules 44B and entropy rules 44C to determine whether there are decoding errors in the decoded video data. Based on the results of these error checks, error detection module 40 controls the value of error flag 46 or any other indicator capable of storing an error state. Assuming for purposes of illustration that error detection module 40 detects a decoding error, error detection module 40 sets error flag 46 and forwards an indication of the error ("DECODING ERROR" in FIG. 3) to decoding engine 32 of video decoder 26.

In response to the error indication, decoding engine 32 may cease decoding and resynchronize decoding, e.g., by stopping the decoding of the current slice and seeking the next available slice in the bitstream. In other words, if the decoding error is detected, decoding engine 32 may stop decoding of the current slice, and proceed to decode the next available slice. Again, the next available slice may be identified by a resynchronization codeword in a NAL unit header of the next slice. Alternatively, if there is no error indication, decoding engine 32 may continue to decode the current slice until it reaches the end of the slice and encounters the next available slice. In either case, upon reaching the next available slice, decoding engine 32 may forward another start segment start indication to error detection module 40. Error detection module 40 receives the new segment start, e.g., sliced start, and determines whether a decoding error was present in the previously decoded slice based on the state of error flag 46.

Based on the state of error flag 46, error detection module 40 may continue analyzing the decoded video or invoke error mapping module 42. For example, if error flag 46 is not set, indicating an error was not detected, error detection module 40 may proceed to perform error detection for the newly received slice. However, if error flag 46 is set, indicating that an error was detected, error mapping module 42 may be invoked by error detection module 40 to determine the error range, i.e., the extent of the corrupted data segment that must be concealed. In this case, error mapping module 42 determines the number of the first MB in the newly received slice. In addition, error mapping module 42 determines the last or end MB in the corrupted data segment in which the decoding error was detected based on the first MB number in the newly received slice.

For example, to determine the end MB number, error mapping module 42 may subtract one from the first MB number of the newly received slice to obtain the number of the last MB that immediately precedes the new slice start. As shown in the example of FIG. 3, the end MB may be stored as end MB 48B. If the first MB in the newly received slice is 55, for example, then the last MB in the corrupted data is 55−1=54. Accordingly, error mapping module 42 defines the error range as extending between and including the start MB 48A and the end MB 48B, e.g., MB 0 to MB 54 in the above example. The error range indicates the MBs that should be concealed to eliminate or reduce the adverse impact of the error on the decoded video data.

As described below, error detection module 40 may, in some aspects, also determine a start and end frame number from values of syntax elements associated with the MBs corresponding to start MB number 48A and end MB number 48B. That is, error detection module 40 may inspect the MB as represented in the received decoded video data that corresponds to start MB number 48A and determine a start frame number with which that MB is associated. Error detection module 40 may forward that start frame number to error mapping module 42, which may store the start frame number as start frame 48C. Error detection module 40 may also inspect the MB as represented in the received decoded video data that corresponds to end MB number 48B and determine an end frame number with which that MB is associated. Error detection module 40 may forward that end frame number to error mapping module 42, which may store the end frame number as end frame 48D.

As described above, error mapping module 42 may generate an error range or other error description from mapping 48 and pass that error range to error concealment module 36. The error range, in some implementations, may include not only the start MB 48A and the end MB 48B for the corrupted data segment, but also the start frame 48C and end frame 48D. For example, error mapping module 42 may determine whether the decoding error (and the resulting corrupted data segment) lies within a single frame by comparing start and end frame 48C, 48D, or whether the decoding error spans two or more frames. MB numbering ordinarily is reset to zero at the start of each frame. Accordingly, providing an error range that only presents MB numbers may not be sufficient when a decoding error affects more than a single frame. If the start MB is MB 74 in a first frame, for example, the end MB could be MB 56 in a second frame. Therefore, it may be necessary to track frame numbers as well as MB numbers in order to accurately resolve the error range for concealment purposes.

In general, if the two frame numbers represented by start and end frame 48C, 48D are equal, error mapping module 42 may determine that the decoding error lies within a single frame that corresponds to the frame number identified by both start frame 48C and end frame 48D. If start and end frame numbers 48C, 48D are not equal, however, error mapping module 42 may determine an error range such that the decoding error spans more than one frame. Hence, error mapping module 42 may be configured to identify a range of MBs that should be concealed using start and end MB numbers 48A, 48B and start and end frame numbers 48C, 48D.

Error concealment module 36 receives the error range and employs concealment engine 50 to conceal the MBs identified by the error range. Error concealment engine 50 may retrieve, and store in video buffer 51, previously decoded MBs of previously decoded frames ("buffered video data" in FIG. 3) for use in concealing those MBs identified by the error range. As described above, in some aspects, the previously decoded MBs may obtained from one or more adjacent frames, and may be spatially co-located with the MBs to be concealed. The previously decoded MBs may replace and thereby conceal the potentially corrupted MBs in the error range to form replacement frame data. In some implementations, error concealment module 36 may obtain the previously decoded MBs as decoded video data from reconstruction buffer 38.

Concealment engine 50 may implement any of a variety of other concealment techniques to conceal a decoding error identified by the error range. Error concealment engine 50 may provide the concealed video data as replacement data to video decoding engine 32. Video decoding engine 32 may provide properly decoded video data and concealed video data to reconstruction buffer 38. Alternatively, the concealed frame data may be use to write or overwrite parts of the decoded video data produced by decoding engine 32 and stored in reconstruction buffer 38. In either case, reconstruction buffer 38 may provide decoded video data for use in driving a display device.

Figure 4:
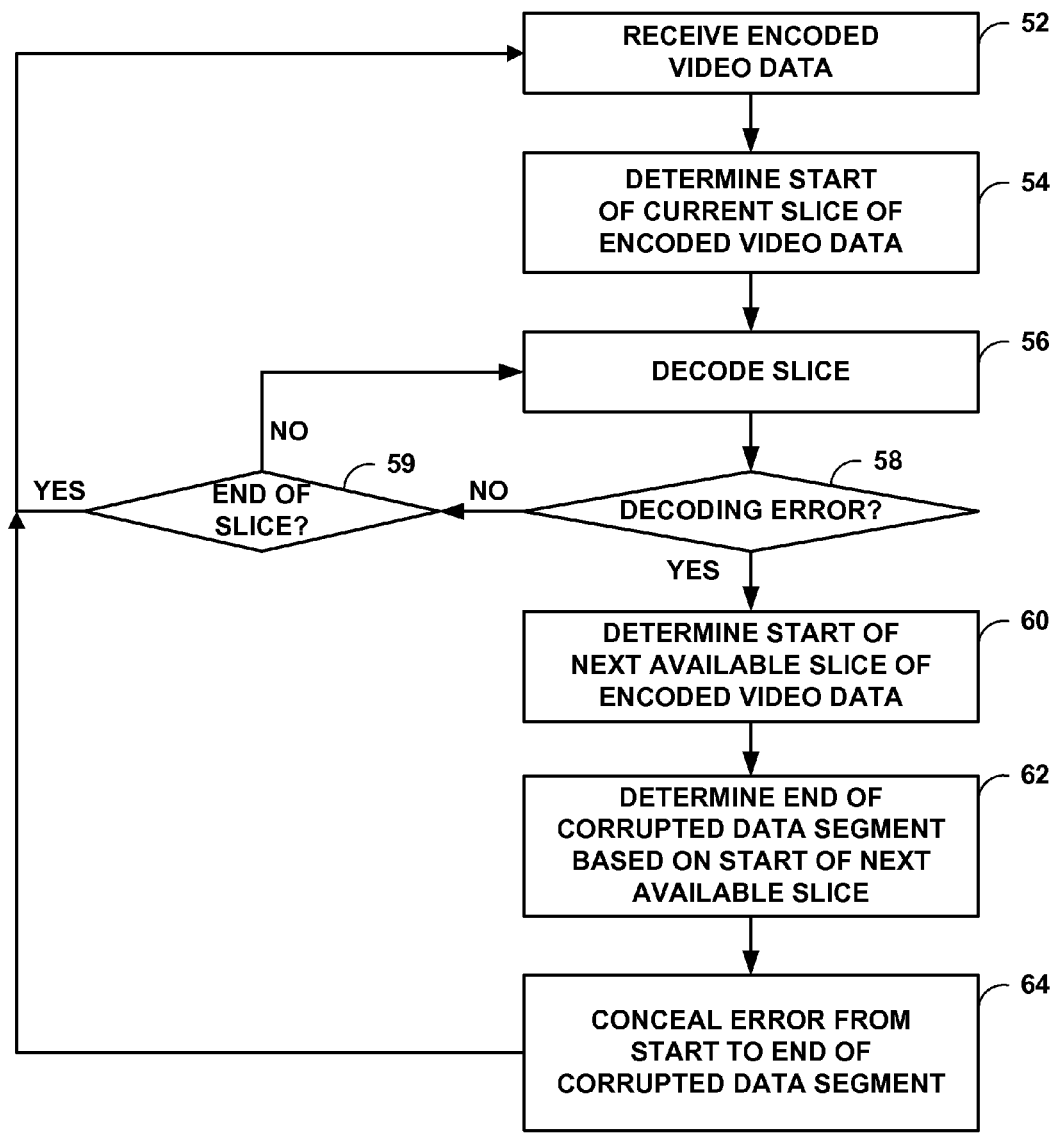
FIG. 4 is a flowchart illustrating example operation of a video decoder in performing sequential error handling and concealment techniques.

FIG. 4 is a flowchart illustrating example operation of a video decoder, such as video decoder 26, in performing sequential error handling and concealment techniques. As described above, video decoder 26 receives encoded video data from a receiver, such as receiver 24 of FIG. 1 (52). Video decoder 26 may buffer the encoded video data in receive buffer 30. Decoding engine 32 may determine the start of a current slice of encoded video data (54), and decode the slice (56). The start of the current slice may be used by error handling module 34 to identify an error range for a corrupted data segment if an error is detected, as will be described. If error handling module 34 has not detected a decoding error (58), and decoding has not reached the end of the current slice (59), decoding engine 32 may continue to decode the slice (56).

If the end of the slice is reached (59) without detection of a decoding error, decoding engine 32 may proceed to receive the next available of additional encoded data (52) and repeat operations (54), (56) and (58) for that slice. When no decoding error is detected (58), video decoder 26 continues to decode consecutive slices in the bitstream. When a decoding error is detected (58), however, error handling module 34 may determine the start of the next available slice encoded video data (60), and determine the end of a corrupted data segment (which includes the current slice) based on the start of the next available slice (62).

Again, the next available slice is the next available segment that can be identified in the bitstream. Hence, the next available slice may be the very next slice following a slice in which the decoding error was detected, in the event the corrupted data affects only a single slice. On the other hand, if the error results in loss or corruption of two or more slices of data, then the next available slice may be a later slice that did not immediately follow the current slice in the originally encoded bitstream.

As described above, based on the start of the next available slice(60), error handling module 34 determines the end of the corrupted data segment associated with corrupted data segment may be obtained by subtracting one from the first MB number in the next available slice. Error handling module 34 provides the start and end of the corrupted data segment to error concealment module 36 to define an error range for concealment. The error range may cover a single slice or multiple slices of the original bitstream, depending on the extent of the data loss.

With the error range, error concealment module 34 conceals the video data extending from the start of the corrupted data segment to the end of the corrupted data segment (64). Upon concealing the corrupted data segment, video decoder 26 may proceed to receive encoded video data (52) associated with the next available slice so that the next available slice may be decoded, i.e., as the new, current slice. In this case, as video decoder 26 proceeds along the video bitstream, the next available slice now becomes the current slice for purposes of the process shown in FIG. 4, and the various operations outlined in FIG. 4 are repeated to support sequential decoding, error handling and concealment.

As described above, error handling module 34 may determine whether a decoding error (58) has occurred based on syntax, semantic, or entropy coding error checks. If error handling module 34 detects an error, error handling module 34 may inform decoding engine 32 of the error. In response to the error indication, video decoder 32 may resynchronize decoding of the encoded video data by parsing the bitstream to determine the start of the next available slice of the encoded video data stored in receive buffer 30 (60). Notably, decoding engine 32 arrives at the next available slice either by parsing the bitstream for resynchronization when a decoding error occurs, or in the ordinary course of decoding the current slice when no error is detected. If an error is detected, error handling module 34 then determines the error range, e.g., the start and end of the first segment, and provides the error range to error concealment module 36.

Figure 5:
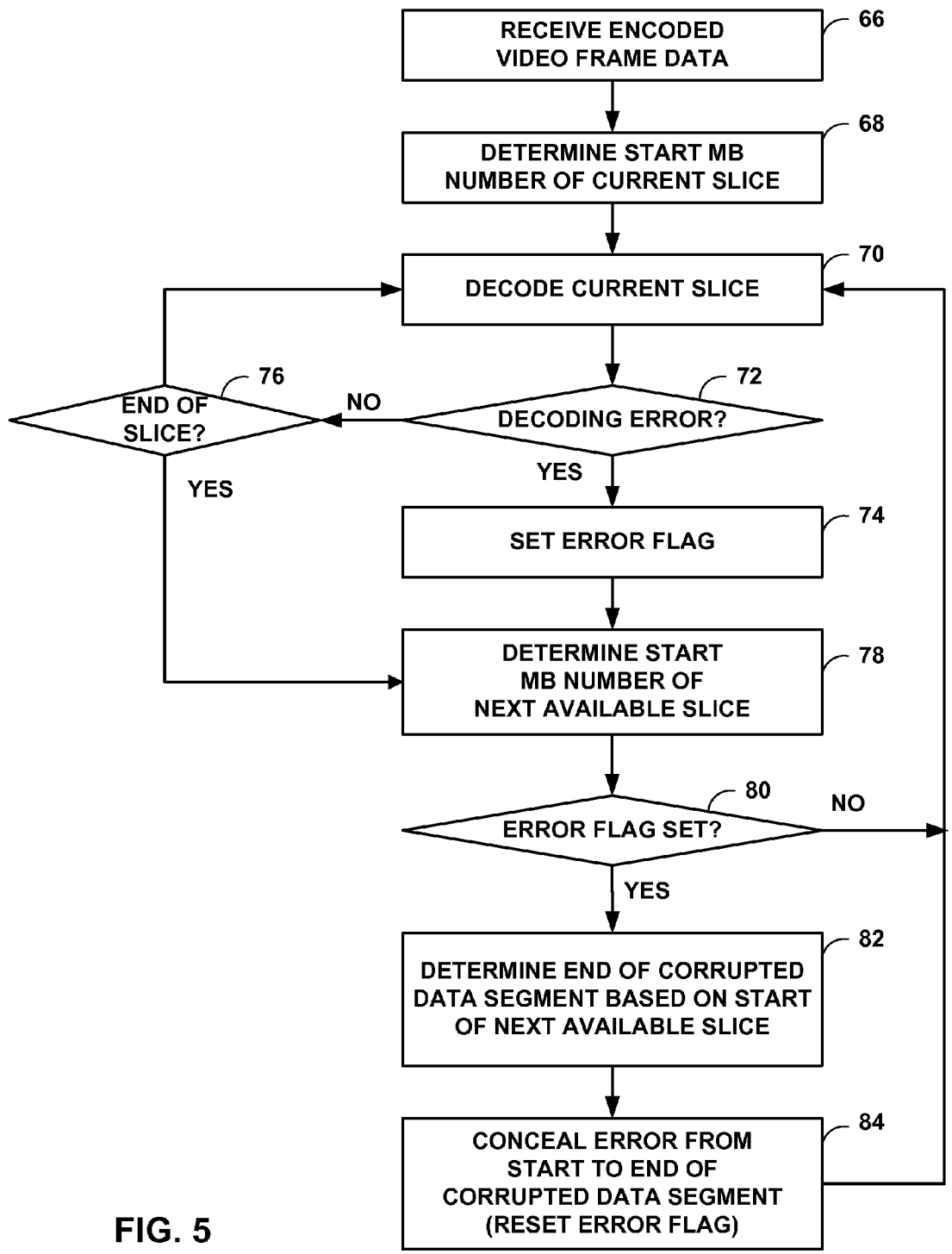
FIG. 5 is a flowchart illustrating example operation of a video decoder in performing error handling and concealment for a decoding error within a frame.

FIG. 5 is a flowchart illustrating example operation of a video decoder, such as video decoder 26, in performing error handling and concealment for a decoding error within a frame. The techniques are described below with respect to a bitstream formulated in accordance with the H.264/MPEG-4 AVC standard, where the encoded video data comprises a plurality of frames, each frame comprising a plurality of slices, and each slice comprising a plurality of encoded MBs. The slices may be identified by NAL unit headers. Although described with respect to the H.264 standard, the techniques should, again, not be strictly limited to this exemplary aspect, but may be broadly applicable to other techniques for encoding of video data.

FIG. 5 generally conforms to FIG. 4 but shows some additional details. In the example of FIG. 5, video decoder 26 may receive encoded video frame data (66) via receive buffer 30. Decoding engine 32 of video decoder 26 may, upon initially accessing a first slice of a first frame, determine a starting MB number associated with the first slice (68). The first slice alternatively may be referred to as a current slice being decoded by decoding engine 32. While the current slice is decoded by decoding engine 32 (70), error handling module 34 may detect a decoding error (72), e.g., such as a syntax, semantic or entropy coding error. If a decoding error is detected (72), error handling module 34 sets an error flag (74).

If a decoding error is not detected (72), and decoding engine 32 has not yet reached the end of he current slice (76), decoding engine 32 continues decoding the current slice (70). If a decoding error is detected (72), or if the end of the current slice has been reached (76), error handling module 34 will determine the start MB number of the next available slice (78). When an error is detected, decoding engine 32 may continue decoding or stop decoding the current slice and parse the bitstream to locate the next available slice. When no error is detected (72), decoding engine 32 reaches the next available slice after completing the decoding of the current slice, in which case the end of slice is reached (76). Hence, decoding engine 32 may arrive at the next available slice either upon successful decoding of the previous slice or as part of resynchronization following detection of a decoding error in the previous slice.

If the error flag is not set (80), decoding engine 32 proceed to decode the next available slice as the current slice (70). Hence, the next available slice may become the current slice for purposes of the operations outlined in FIG. 5, and the decoding process is repeated. If the error flag is set (80), however, error handling module 34 determines the end MB number of the corrupted data segment including the current slice based on the start MB number of the next available slice (82). For example, error handling module 34 may subtract one from the start MB number of the next available slice to determine the end MB number of the segment including the first slice (82).

The end MB number may be the end MB number of the current slice if one slice was corrupted. If more than one slice was corrupted, however, the end MB number may be the end MB number of a later slice. In any event, using the start MB number of the current slice and the end MB number, error handling module 34 defines an error range for use by error concealment module 36. Error concealment module 36 proceeds to conceal the decoding error by concealing all MBs from the start MB number of the current slice to the end MB number of the corrupted data segment(84). Upon completing error concealment (84), video decoder 26 may reset the error flag for the next slice to be decoded, i.e., to clear any lingering stored state that may not be relevant to the next slice to be decoded. In addition, video decoder 26 proceeds to decode the next available slice as the current slice (70), and repeat the various error handling operations outlined in FIG. 5.

Figure 6:
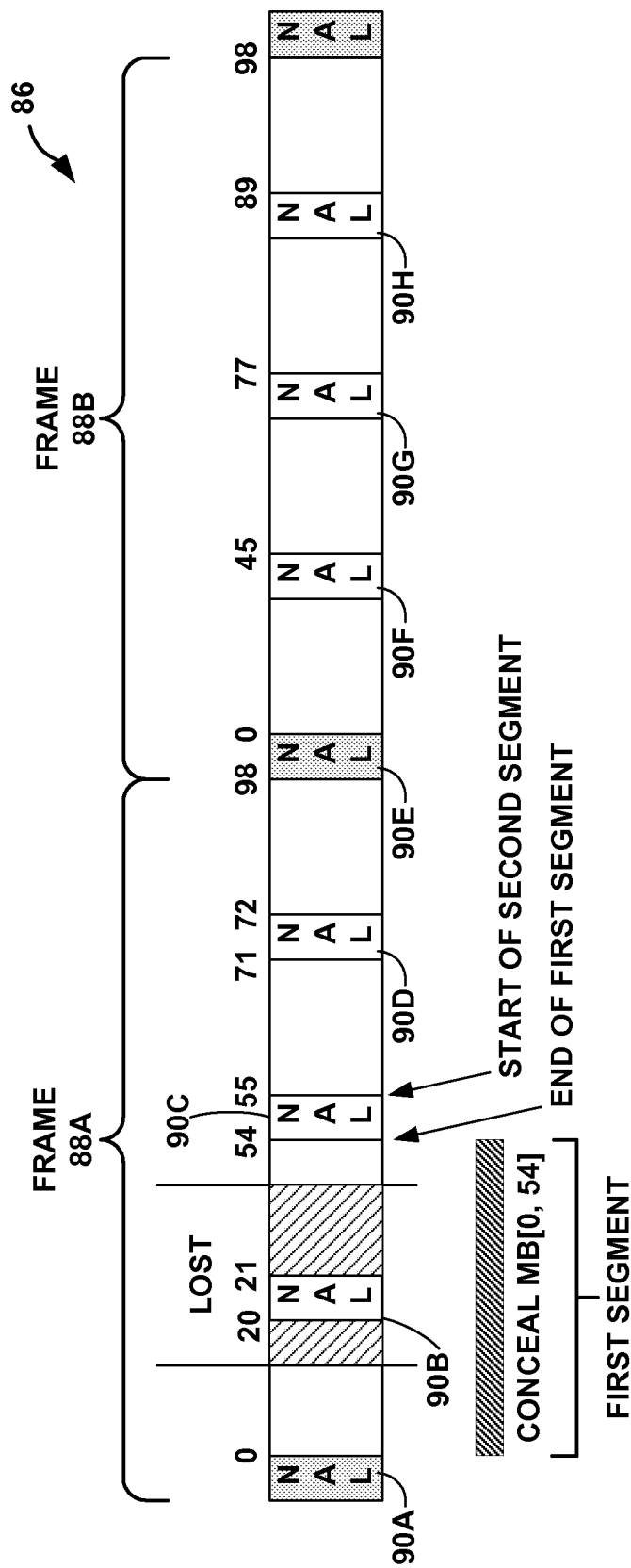
FIG. 6 is a diagram illustrating application of error handling and concealment techniques to an example bitstream comprising a decoding error within a frame.

FIG. 6 is a diagram illustrating application of error handling and concealment techniques to an example bitstream 86 comprising a decoding error within a frame. Bitstream 86 may be generally formatted in accordance with the H.264/MPEG-4 AVC standard. In the example of FIG. 6, a decoding error occurs in the middle of the bitstream and contains one NAL unit header. A sequential error handling technique may be applied to the scenario of FIG. 6 to identify MBs 0-54 for error concealment. FIG. 6 illustrates two frames 88A, 88B ("frames 88"), where frame 88A comprises a plurality of NAL headers 90A-90D and frame 88B comprises a plurality of NAL headers 90E-90H. NAL headers 90A and 90E are each shown in shaded form to represent that these NAL headers mark the start of respective frames 88. Each of NAL headers 90A-90H ("NAL headers 90") marks the start of a NAL unit, which contains a slice. Each frame 88 may include one or more slices, and more likely multiple slices. Each NAL unit ends at the start of a subsequent one of NAL headers 90.

For example, a first slice may comprise NAL header 90A and a subsequent plurality of MBs corresponding to MB numbers 0-20, where MB number 20 is the last MB before subsequent NAL header 90B. The next slice commences with NAL unit header 90B and MB number 21. Example MB numbers are shown at the top of each of frames 88. The spacing of such numbers does not necessarily reflect the scale or proportion of an actual bitstream, and is provided for purposes of illustration. A NAL unit, which as described above contain a "slice," may be independently decoded. In other words, a slice can be decoded without information from other NAL units. In this manner loss of a NAL unit does not necessarily impede decoding of preceding or subsequent NAL units for a given frame, as each NAL unit is a self-contained sequence of decodable MBs.

As described previously, some video decoders, especially those implemented as software modules, may handle decoding errors by performing a look-ahead error handling technique. To decode a current slice, a look-ahead technique typically requires a video decoder to decode the next available slice header, e.g., NAL header, in order to determine the last block or MB of the first slice. That is, a video decoder may look ahead to the next slice header and determine the range of the slice currently being decoded. The video decoder may further identify the last MB of the current slice prior to decoding the current slice so as to identify a portion of the encoded video data to conceal in the event that a decoding error is detected while decoding the current slice. The video decoder may perform this look-ahead operation for each slice of the encoded video data, which may result in inefficiency, computational complexity and excessive power consumption.

A video decoder that employs a look-ahead error handling technique may be characterized as performing non-sequential decoding. As an example, the conventional video decoder may first determine the starting MB of the current slice, and then look ahead in the bitstream to detect the next resynchronization codeword and thereby determine the last MB in the current slice. In particular, the resynchronization codeword is used to identify the next properly received slice. After looking ahead, the decoder then returns to decode a buffer version of the current slice. By determining the first MB number N for the next slice, a video decoder can determine the last MB number in the previous slice, i.e., MB N−1. Upon identifying the last MB number, the video decoder would return back to the starting MB of the current video slice and begin decoding the slice.

Hence, implementation of a look-ahead error handling technique may require two different decoding buffers to buffer the current slice and the next slice. The video decoder may switch back and forth between each buffer in order to properly reconstruct the original video data. The non-sequential nature of this technique may result in more complicated or complex implementation, as a video decoder may be required to store all of the current state information for one slice, move to the next slice, and then revert to the first slice. This operation can be undesirable for embedded systems, especially when overall decoding tasks are split between two or more processors.

With reference to the example of FIG. 6, an error handling process based on look-ahead operations will first be described. In this example, frame 88A includes a first slice extending from MB 0 to MB 20, a second slice extending from MB 21 to MB 54, a third slice extending from MB 55 to MB 71, and a fourth slice extending from MB 72 to MB 98. To decode the current slice, the video decoder first looks ahead to find the first available resynchronization point. If it is assumed that MB 15 to MB 45 are lost or otherwise corrupted, then the video decoder finds the next resynchronization point at NAL header 90C. In the meantime, the video decoder has no actual knowledge of a decoding error, but needs to obtain the next resynchronization point through the look-ahead operation so that the last MB prior the resynchronization point can be obtained in the event there is a decoding error.

Hence, in an error handling process that relies on a look-ahead operation, the video decoder gets the first MB number of the current slice to be decoded, looks ahead to decode the next slice header to get the last MB number prior to the slice header, returns to the start of the current slice to be decoded, resumes decoding and detects an error, passes the first MB and last MB to an error concealment operation, and re-establishes decoding synchronization and error concealment for the next slice to be decoded. Notably, the video decoder needs to buffer slices 1 and 2 (MB 0 to 54) while it performs the look-ahead operation, and then return to slice 1 to start the decoding operation. In general, the video decoder performs these look-ahead and buffering operations for all slices to be decoded in the bitstream, whether an actual decoding error exists or not. Actual decoding of a slice does not even occur until after the look-ahead operation.

Transmission of the encoded video data via channel 16 may often occur without noticeable loss or corruption of encoded video data. For example, assuming for purposes of illustration that the encoded video data is transmitted across channel 16 as a plurality of packets, packet loss rates for a typical wireless channel 16 are often less than 5%. Assuming for purposes of illustration that each packet corresponds to one slice, 95% of the computations for look-ahead error handling techniques will not be required, as no decoding error will occur during decoding of valid encoded video data. Thus, the look-ahead error handling technique may result in numerous wasted operations.

While these wasted operations and other issues described above are of less consequence when error handling is implemented in software, embedded systems may be greatly impacted by these issues, especially when the overall decoding tasks are split into two or more processors. In particular, in embedded implementations or, more generally, hardware implementations of the look-ahead technique, the wasted operations may unnecessarily consume power that can be used for more worthwhile operations. Moreover, as power consumption drains batteries common in mobile destination devices, similar to destination device 14, wasteful power consumption may result in shorter operational times before the battery requires a recharge. In addition, two processors may exacerbate these power issues. Furthermore, the additional buffer used to buffer the next slice may drain power and further increase the cost and size of conventional video decoders.

A video decoder, such as video decoder 26 of FIG. 2, may receive frames 88 and perform a sequential, i.e., non-look-ahead, error handling process in accordance with the techniques described in this disclosure. With a sequential error handling process, the decoding order of each slice can be maintained in sequence. There is no need to pre-buffer one slice and then perform a look-ahead operation to access the NAL header of the next slice. Decoding engine 32 may access a first NAL unit or slice of frame 88A, e.g., NAL header 90A and MBs 0-20, and determine the start of the current slice by determining the first MB number, e.g., MB 0. Decoding engine 32 may forward this MB number 0 to an error detection module of error handling module 34, such as error detection module 40 of FIG. 3. Having previously reset error flag 46, as described above, error detection module 40 forwards the MB number of 0 to error mapping module 42, which stores the MB number of 0 to start MB 48A of mapping 48.

Decoding engine 32, meanwhile, decodes encoded MBs 0-20, storing this decoded video data or decoded MBs in reconstruction buffer 38. Decoding engine 32 also forwards the decoded MBs 0-20 to error detection module 40, which may determine whether a decoding error occurred though application of error checks. For example, error detection module 40 may perform syntax and semantic error check in accordance with syntax and semantic rules 44A, 44B, respectively, as well as an entropy coding check in accordance with entropy rules 44C.

In the example of FIG. 6, at least some of MBs 0-20, NAL header 90B and some of MBs 21-54 have been lost or corrupted. Error detection module 40 may detect this decoding error and set error flag 46 to indicate the error. By setting flag 46, error detection module 40 may delay error concealment until the next identifiable slice header, e.g., NAL header 90C, is being decoded. As a result, video decoder 26 need not look ahead to determine the last MB number prior to decoding the current slice but maintains flag 46 to indicate that the previous slice is in error. In this manner, video decoder 26 may decode the current slice or segment of the encoded video data on the assumption that the data contains no error. Upon determining an error, however, the error flag 46 is set so that error handling module 34 can handle the error at a later time, e.g., after the next slice header is decoded.

Assuming for purposes of illustration that error detection module 40 detected the above described decoding error and set error flag 46, error detection module 40 may inform decoding engine 32 of the decoding error. As a result, decoding engine 32 may cease decoding and reestablish decoding synchronization or otherwise resynchronize decoding of frame 88A by seeking the next identifiable NAL header, i.e., NAL header 90C in the example shown in FIG. 6. After reestablishing decoding synchronization, decoding engine 32 may access the next available slice of the encoded video data, e.g., the NAL unit or slice identified by NAL header 90C and MB numbers 55-72. Decoding engine 32, as described above, may determine a start of this next available slice of the encoded video data by accessing the MB number corresponding to the start of the segment, e.g., MB number 55. Decoding engine 32 may forward this MB number to error detection module 40.

In response to receiving the start of the second segment, e.g., MB number 55, error detection module 40 determines the state of error flag 46. If error flag 46 is not set, error detection module 40 passes the MB number to error mapping module 42, which stores MB number 55 to start MB 48A of mapping 48 to support decoding of the next available slice as the current slice. Alternatively, if error flag 46 is set, error detection module 40 passes MB number 55 minus one to error mapping module 42, instructing error mapping module 42 to store MB number 54 as end MB 48B of mapping 48. Error mapping module 42 then forwards mapping 48 to error concealment module 36 to identify the range of the decoding error. The error range defines the extent of the corrupted data segment that contains the slices associated with slice headers 90A, 90B. In the example of FIG. 6, error mapping module 42 forwards start MB 48A and end MB 48B, and concealment engine 50 conceals the MBs identified by start and end MBs 48A, 48B (MB 0 to MB 54) in reconstruction buffer 38, as described above.

Decoding engine 32 may continue to decode frame 88A by accessing the next available slice or NAL unit identified by NAL header 90D. Once frame 88A has been decoded, decoding engine 32 may further decode frame 88B. As no decoding errors exist in frame 88B in the example of FIG. 6, error handling module 34 may not detect an error, and error concealment module 36 may not conceal any further errors. In this manner, video decoder 26 may decode each slice in sequence and, as a result, video decoder 26 may include a smaller buffer 32, as it is not necessary to buffer the current slice to support a look-ahead operation. Further, video decoder 26 may not consume as much power as there is very little additional computation involved other than normal decoding. In other words, error handling module 34 is invoked when decoding errors are detected, rather than continuously, thereby saving computations and reducing power consumption.

In various aspects, the sequential error handling technique may maintain the above described decoding efficiency as well as simplify the architecture of video decoder 26, especially when implemented by two or more processors. That is, one processor may, for example, implement decoding engine 32 and another processor may implement error handling module 34. Communications between the two processors may complicate the architecture. By limiting these communications, the techniques may reduce implementation complexity. As communications may only arise when an error occurs, the techniques may limit the number of communications between the processors, thereby reducing the complexity of the error handling architecture. In terms of architecture, because the decoding is performed in sequential order for every slice, there is no need for software or hardware to maintain double buffers for the current slice and the next available slice and switch back and forth between such buffers. In addition, there is no need to store decoding status information for the previous slice in case error concealment is needed.

Figure 7:
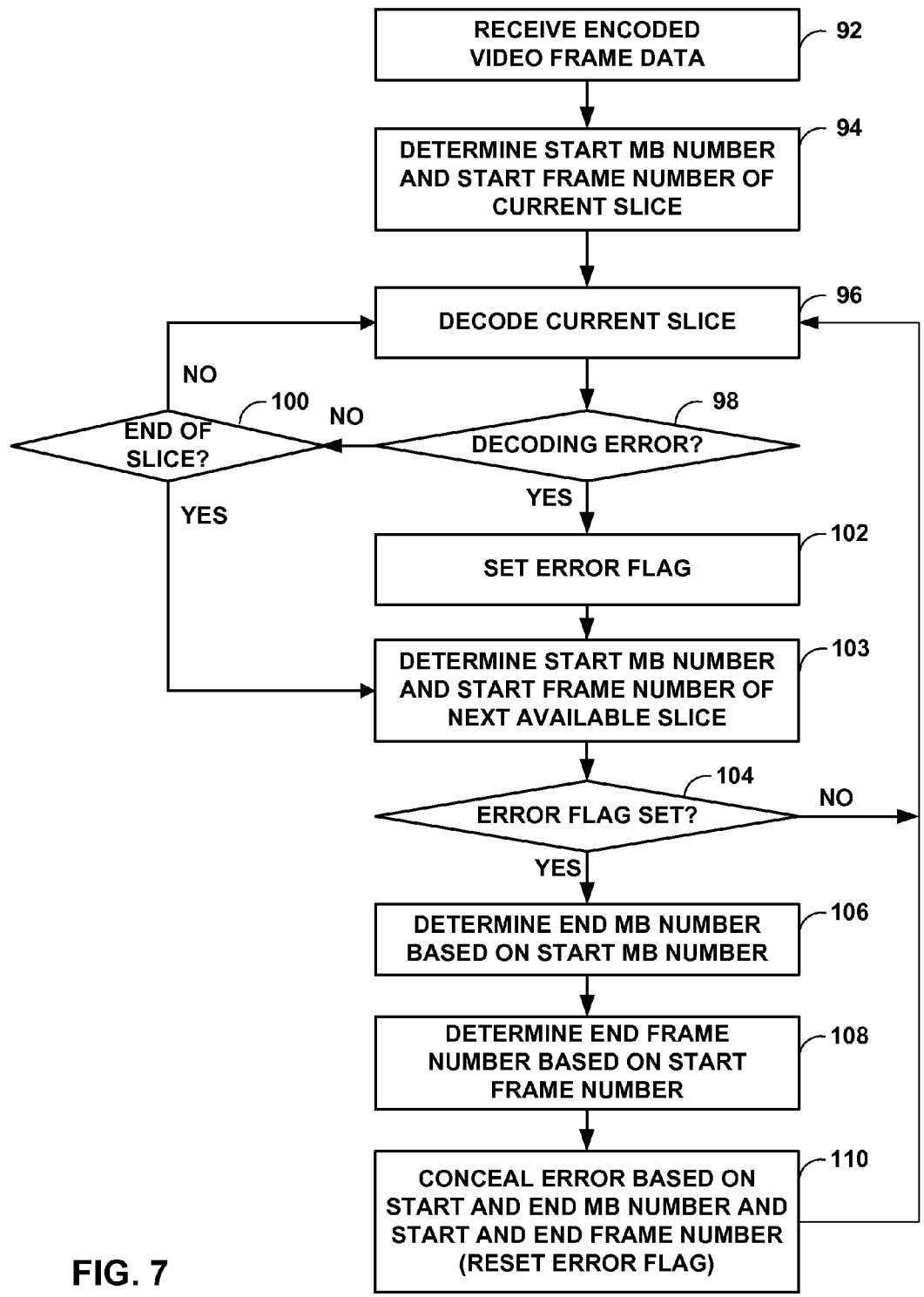
FIG. 7 is a flowchart illustrating example operation of a video decoder in performing error handling and concealment for a decoding error that spans two or more frames.

FIG. 7 is a flowchart illustrating example operation of a video decoder, such as video decoder 26, in performing error handling and concealment for a decoding error that spans two or more frames. Video decoder 26, as described above, may receive encoded video frame data, which may comprise a plurality of encoded video frames (92). Decoding engine 32 of video decoder 26 may, upon initially accessing a current slice of a frame, cause error handling module 34 to determine a start MB number and start frame number of the current slice (94). The start MB number of the slice represents the start of the segment in which a decoding error might be detected. The start frame number indicates the number of the frame in which the current slice resides. The start MB and start frame numbers may be determined from one or more syntax elements, which may be contained in a NAL header associated with the current slice.

Upon determining the start MB and start frame numbers, decoding engine 32 decodes the current slice (96), and outputs the decoded MBs from the current slice to error handling module 34 for error detection. Error detection module 40 of error handling module 34 determines whether a decoding error occurred (98), e.g., by performing syntax, semantic and/or entropy coding error checks in accordance with syntax rules 44A, semantic rules 44B, or entropy rules 44C. If no decoding error was detected (98), and the end of the slice has not been reached (100), decoding engine 32 continues to decode the current slice (96). If no decoding error was detected (98), but the end of the current slice has been reached (100), the current slice has been successfully decoded. In this case, decoding engine 32 proceeds to decode the next available slice as the current slice. If the current slice was the first slice in a video sequence, then the next slice is the second slice. Alternatively, if the current slice is not the first slice, then the next slice is a later slice in the video sequence. The later, next available slice may reside in the same frame as the current slice or in a different frame. In any event, when decoding engine 32 proceeds to the next available slice, the decoding engine 32 may determine the start MB number and start frame number of the next available slice (103).

If a decoding error is detected (98), error detection engine 40 may inform decoding engine 32 of the decoding error and set error flag 46 (102). Decoding engine 34, in response to being informed of the error, may resynchronize decoding by proceeding to the next available or identifiable slice, as described above. In this case, decoding engine 32 may determine the start MB number and start frame number of the next available slice (103). Decoding engine 96 may proceed to decode the next available slice as the current slice (96), as will be explained. Decoding engine 32 may arrive at the next available slice (103) either upon successful decoding of the previous slice or as part of resynchronization following detection of a decoding error in the previous slice. In each case, error handling module 34 may determine whether the error flag is set (104). If the error flag is set (104), then the next available slice was accessed as a result of detection of a decoding error (98). If not, the next available slice was accessed as a result of successful decoding of the previous slice and the detection of the end of the previous slice (100).

If the error flag is not set (104), decoding engine 32 may proceed to decode the next available slice as the current slice (96). In other words, the next available slice obtained by decoding engine 32 becomes the current slice and the process is repeated. If the error flag is set (104), however, error handling module 34 determines the extent of the corrupted data segment that needs to be concealed. For example, error detection module 40 may determine an end MB number based on a start MB number of the next available slice (106) and an end frame number based on the start frame number of the next available slice (108). The end MB number and end frame number may be the end MB number and end frame number of the current slice if the decoding error involved only a single slice. If multiple slices were impacted by the decoding error, however, the end MB number and end frame number may correspond to another, later slice that resides between the current slice and the next available slice and forms part of a multi-slice, corrupted data segment. In either case, error mapping module 42 may determine the end MB number and end frame number based on the start MB number and start frame number, respectively, of the next available slice. Again, the end MB number may be the start MB number of the next slice minus one. Error concealment module 36 then may conceal the error by concealing MBs from the start MB of the current slice to the end MB of the corrupted data segment (110). Following concealment, decoding engine 32 may proceed to the decode the next available slice, which was used to generate the end MB and end frame, as the new current slice (96).

Error mapping module 42 may store the end MB and end frame numbers to mapping 48 as end MB 48B and end frame 48D. Error mapping module 48 may then determine an error range based on start MB 48A, end MB 48B, start frame 48C, and end frame 48D and forward this range to concealment engine 50 of error concealment module 36. Concealment engine 40, as described above, conceals the detected decoding error based on the error range, e.g., start and end MBs. 48A, 48B and start and end frames 48C, 48D, in accordance with any of a variety of concealment techniques (110). In operation, error mapping module 48 may determine the error range by taking into account not only the start and end MB numbers but also the frame numbers. If a decoding error crosses frame boundaries, the end MB number could actually be less than the start MB number of the segment to be concealed. Tracking the frame number may permit the error range to be properly resolved in this type of situation.

Figure 8:
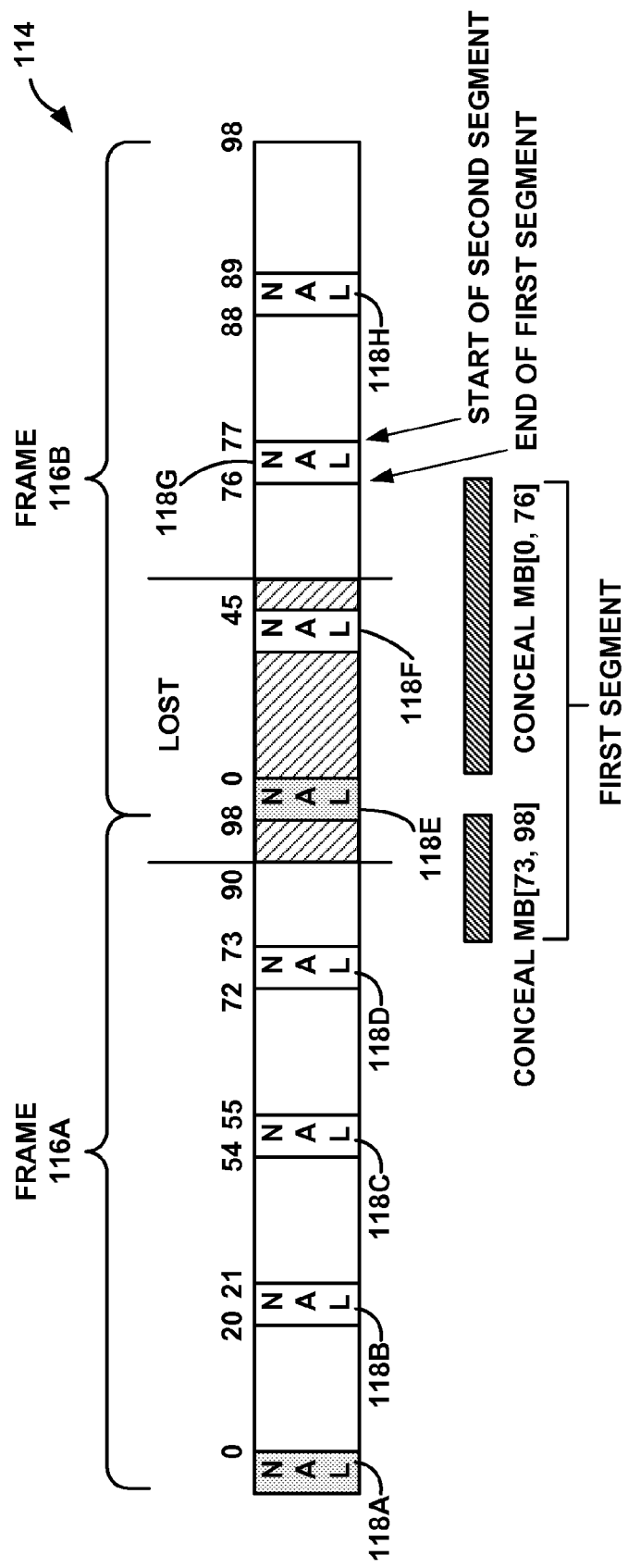
FIGS. 8 is a diagram illustrating application of error handling and concealment techniques to an example bitstream containing an error that spans two or more frames.

FIGS. 8 is a diagram illustrating application of error handling and concealment techniques to an example bitstream containing an error that spans two or more frames. FIG. 8 is similar to FIG. 6, but depicts a scenario in which a decoding error spans two consecutive frames such that the next available slice for resynchronization after detecting an error resides in the a different frame than the current slice. As shown in FIG. 8, a sequential error handling technique can be applied to the case in which data across two frames is lost by tracking frame numbers. In a conventional system, when an error spans two frames, the second frames may be completely discarded. With a sequential error handling technique, however, a decoder may check the frame number of the slice header to determine if a new frame has started before finishing the current frame. If so, the decoder may conceal the remaining MBs of the current frame and process a new frame. The first few MBs of the second frame up to the next slice header may be concealed. However, the remaining MBs in the second frame may be retained.

A sequential error handling technique may be applied to the scenario of FIG. 8 to identify MBs 73-98 of a first frame and MBs 0-76 of a second frame for error concealment. FIG. 8 illustrates a bitstream 114 that includes two frames 116A, 116B ("frames 116"), where frame 116A comprises a plurality of NAL headers 118A-118D specifying respective slices, and frame 116B comprises a plurality of NAL headers 118E-118H specifying respective slices. NAL headers 118A and 118E are each shown in shaded form to represent that these NAL headers mark the start of respective frames 116. Each of NAL headers 118A-118H ("NAL headers 118") marks the start of a NAL unit, which may contain a slice.

Each NAL unit ends at the start of the subsequent one of NAL headers 118. For example, a first NAL unit may comprise NAL header 118A and a slice containing MBs corresponding to MB numbers 0-20, where MB number 20 is the last MB before subsequent NAL header 118B. MB numbers are shown at the top of each of frames 116. A NAL unit, which may contain a slice, may be independently decoded, i.e., decoded without information from other NAL units. In this manner, loss of a NAL unit does not impede decoding of preceding or subsequent NAL units, as each NAL unit is a self contained sequence of decodable MBs.

A video decoder, such as video decoder 26 of FIG. 2, may receive these frames 116 and perform a non-look-ahead, sequential error handling operation in accordance with the techniques described in this disclosure. Decoding engine 32 may access a first NAL unit or slice of frame 116A, i.e., NAL header 118A and MBs 0-20, and determine the start of the first segment by determining the first MB number, e.g., MB 0, as well as, a frame number. Decoding engine 32 may forward this MB number 0 to an error detection module of error handling module 34, such as error handling module 40 of FIG. 3. Error detection module 40 forwards the MB number of 0 and the frame number to error mapping module 42, which stores the MB number of 0 and the frame number to mapping 48 as start MB number 48A and start frame number 48C. In this example, the start MB number may be MB 0 and the start frame number may be frame 0.

Decoding engine 32 decodes encoded MBs 0-20, storing this decoded video data (e.g., decoded MBs) in reconstruction buffer 38. Decoding engine 32 also may provide the decoded MBs 0-20 to error detection module 40, which may determine whether a decoding error occurred though application of error checks. If no error is detected, video decoder 32 accesses a next slice, e.g., designated by NAL header 118B and MB numbers 21-55, passes an MB start number and the frame number to error detection module 40 and decodes this slice. Error detection module 40 determines a status from error flag 46. In this example, error flag 46 has not been set because a decoding error was not detected in the previous slice (MBs 0-20). Error mapping module 42 receives the start MB number and frame number of this second slice (MBs 21-54), and stores the start MB and start frame numbers in mapping 48 as start MB 48A and start frame 48C. Decoding engine 32, error detection module 40 and error mapping module 42 may continue operating in this manner for subsequent slices until an error is detected.

In the example of FIG. 8, some of the last slice (MBs 73-98) of the first frame 116A, NAL header 118E of frame 116B, all of the first slice (MBs 0-45) of the second frame 116B, NAL header 118F of frame 116B and some of the second slice (MBs 45-77) of frame 116B have been lost or corrupted ("LOST"). Prior to this error, error detection module 42 may receive start MB number 73 and a frame number corresponding to first frame 116A. Error mapping module 42 may store this MB number of 73 and the frame number to mapping 48 as start MB 48A and start frame 48C, as described above. In the course of decoding by decoding engine 32, error detection module 40 may detect this decoding error and set error flag 46. Error detection module 40 may also inform decoding engine 32 of the error, whereupon decoding engine 32 reestablishes decoding synchronization in the manner described above. In particular, decoding engine 32 may access the next available slice by seeking the next NAL unit header.

In the example of FIG. 8, decoding engine 32 identifies the next available NAL unit having NAL header 118G and MB numbers 77-88. NAL header 118G indicates the next available NAL unit in the sense that the NAL unit comprising MBs 77-88 is the next NAL unit for which a NAL header can be readily discerned by parsing the bitstream. Decoding engine 32, as described above, may determine a start MB number of the next available slice, e.g., MB number 77 of the slice indicated by NAL header 11 8G, and a position of this segment relative to other encoded video data, e.g., the frame number (1). Decoding engine 32 may provide the start MB number 77 and the frame number (1) corresponding to frame 116B to error detection module 40.

Error detection module 40, upon receiving the MB number of 77 and the frame number of 1 corresponding to frame 116B, determines the status of error flag 46. Assuming for purposes of illustration that error detection module 40 previously detected the error and that error flag 46 is set, error detection module 40 determines an end of the previous segment based on the start MB number of 77 of the slice comprising MBs 77-88. In this example, error detection module 40 computes the end of the corrupted data segment by subtracting one from MB number 77 to obtain MB number 76. Error detection module 40 forwards end MB number 76 and the frame number 1 to error mapping module 42, which stores these numbers to mapping 48 as end MB 48B and end frame 48D, respectively. Once stored, error mapping module 42 forwards mapping 48, which may be referred to as the "error range," to error concealment module 36.

Concealment engine 50 may determine from start and end frames 48C, 48D that the decoding error spanned two frames and that MBs were lost from the end of frame 116A and the beginning of frame 116B based on start and end MBs 48A, 48B. Concealment engine 50 may also receive either from decoding engine 32, error detection module 40 or error mapping module 42 a maximum frame length, which in this instance is shown in FIG. 8 as 98 MBs. That is, the maximum frame length may be defined as the last MB number of one of frames 116. A maximum frame length of 98 MBs corresponds to the number of MBs in a quarter common intermediate format (QCIF) frame. Concealment engine 50 may subtract the end frame number stored as end frame 48D from the start frame number stored as start frame 48C to compute a difference in frame number.

If the computed frame different number is zero, i.e., the start and end are within the same frame number, concealment engine 50 may replace or otherwise conceal MBs from the start MB number, e.g., MB number 73, up to the end MB number just prior to the start MB number of the next available slice. Again, concealment engine 50 may directly conceal the MBs in reconstruction buffer 38 or provide the concealed MBs to decoding engine 32 for use in concealing the decoded video MBs provided to the reconstruction buffer. With reference to FIG. 8, if the computed frame number difference is less than or equal to one, i.e., the decoding error spans portions of frame 0 (116A) and frame 1 (116B), concealment engine 50 may replace or otherwise conceal the MBs corresponding to the start MB number stored as start MB 48A, e.g., MB number 73, up to the MB corresponding to the maximum frame length, e.g., MB number 98. In this manner, when the error spans two frames, the remainder of the first frame from the start of the first slice that included the error to the end of the frame is concealed.

If the frame difference is greater than one, as described below, concealment engine 50 may insert additional frames and conceal MBs corresponding to MB numbers 0-98 for each of the intermediate frames between the first frame in which the error occurred to the last frame in which the same error occurred. In this case, a frame difference of two or greater between the start frame number and the end frame number indicates that at least one entire frame has been lost. A frame difference of three would indicate that two entire frames have been lost, a frame difference of four would indicate that three entire frames have been lost, and so forth. At the last frame, concealment engine 50 may conceal MBs corresponding to MB numbers 0 through the MB number stored as end MB 48B, e.g., 76.

In the instance illustrated in FIG. 8, concealment engine 50 determines a difference equal to one, as the decoding error spans consecutive frames 116A and 116B, and conceals MBs corresponding to the MB number stored as start MB 48A, e.g., 73, through the maximum frame length, MB number 98. Because the difference is not two or greater, concealment engine 50 reaches the last frame over which the decoding error spans, and conceals MBs corresponding to MBs numbers of 0 through the MB number stored to end MBs 48A, e.g., 76. In summary, MBs 73-98 of frame 1 and MBs 0-76 are concealed. If the frame difference is greater than or equal to two, instead of simply discarding the lost reference frames, concealment engine 50 may insert a number of frames equal to the number of frames that have been lost, thereby avoiding reference frame mismatch. By not discarding the missing frames as is common in conventional video decoders, the techniques may improve decoding performance, as described below with respect to FIGS. 9A, 9B and 9C.

Figure 9A:
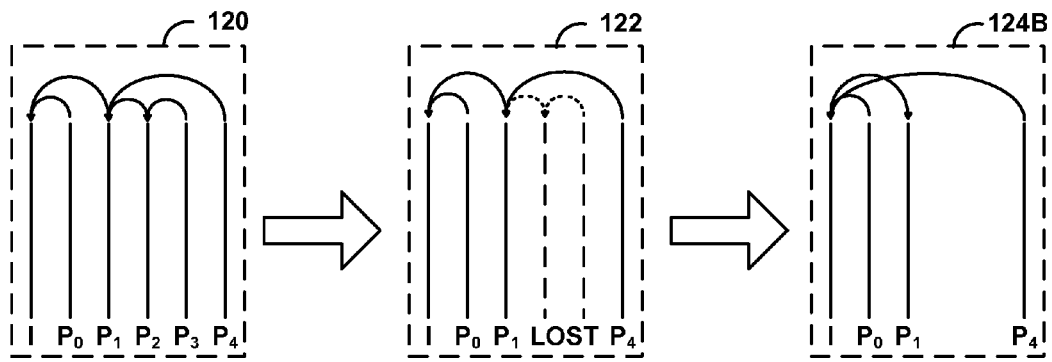
FIGS. 9A, 9B and 9C are diagrams illustrating application of error handling and concealment techniques for a bitstream that permits multiple reference frames.
Figure 9B:
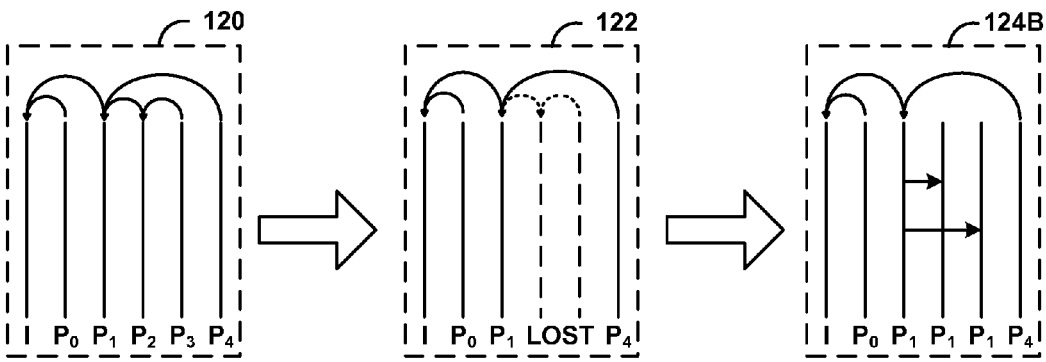
Figure 9C:
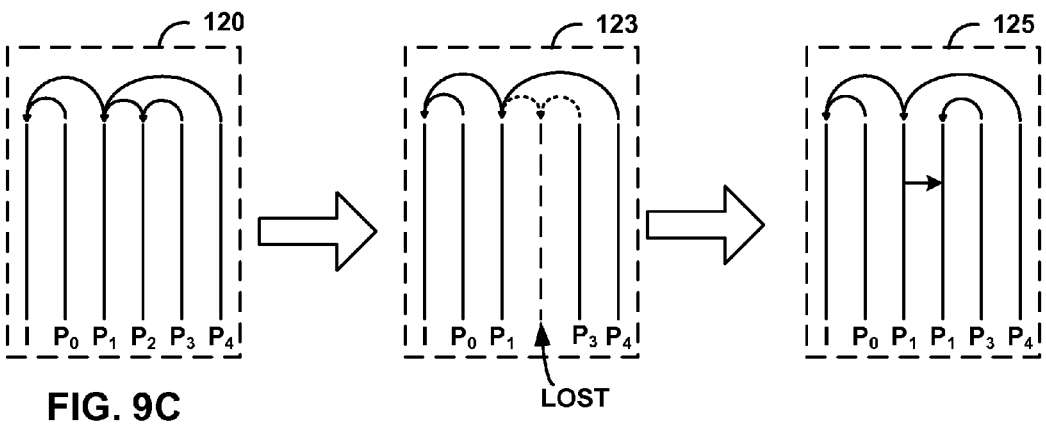

FIGS. 9A, 9B and 9C are diagrams illustrating application of error handling and concealment techniques for a bitstream that permits multiple reference frames. FIG. 9A depicts a bitstream 120 that includes a plurality of frames labeled "I," "$P_0$," "$P_1$," "$P_2$," "$P_3$" and "$P_4$." The I frame refers to a frame known as an H.264/MPEG 4 AVC intra frame and the P frames refer to H.264/MPEG 4 AVC inter-prediction frames. In general, an I frame may form a reference for one or more P frames in that P frames may be coded such that each P frame references at least some video data present in the I frame. As a result, an I frame does not rely on inter-prediction and may be used to resynchronize decoding in that an I frame is not dependent on any previous or subsequent frame. Thus, although not shown in FIG. 9, an I frame may follow a NAL header, such that video decoder 26 may retrieve the next available slice identified by a NAL header and decode an I frame without carrying forward any errors due to previously lost or corrupted MBs. In addition, P frames may reference other P frames.

In the H.264 process, using multiple reference frames is a common feature to improve coding efficiency. The H.264 process does not limit the use of only the previous frame as a reference frame and allows motion compensated prediction to be based on reference frames as far away as sixteen past frames. Not only may this feature improve coding efficiency, but it also may help to mitigate error propagation and is usually mentioned as an error resilient tool at the encoder.

When a frame is completely lost, a decoder may continue decoding the next frame without the need to know that there is a lost frame. This approach may be effective when only the previous frame is used as a reference frame because the decoder cannot generally provide any better results unless a complicated error concealment method is used to estimate the entire lost frame. When multiple reference frames are used (as in H.264), however, it is more likely that frame loss may cause a correctly received frame to refer to a wrong frame for prediction. This incorrect reference caused by one or more lost frames may be referred to in this disclosure as reference frame mismatch.

The arrows at the top of each frame designate the reference frame dependencies between the plurality of P frames, e.g., $P_0$, $P_1$, $P_2$, $P_3$ and $P_4$ and the I frame. Syntax elements in the bitstream may include reference frame index information that identifies a reference frame for each received P frame, e.g., based on a frame number or frame number offset value. As shown in FIG. 8B, frames $P_0$ and $P_1$ depend on the I frame as a reference frame for inter-prediction, frames $P_2$ and $P_4$ depend on frame $P_1$, and frame $P_3$ depends on frame $P_2$. A video encoder, such as video encoder 20 of FIG. 1, may encode bitstream 120 in the manner depicted by the above listed dependencies to compress the bitstream and improve transmission efficiency, as described above.

As also described above, bitstream 120 may be subject to loss or corruption during transmission via a transmission channel 16 to receiver 24, resulting in video decoder 26 receiving a bitstream 122 in which one or more frames are lost or corrupted. Bitstream 122, as shown in FIG. 9A, only includes the I frame and frames $P_0$, $P_1$ and $P_4$. In this example, frames $P_2$ and $P_3$ are lost or otherwise corrupted in transmission. As a result, the frame number difference between consecutively received frames $P_1$ and $P_4$ is three (4 minus 1), indicating the loss of two entire frames. If the frame number difference between consecutively received frames was two, then the loss of one entire frame would be indicated.

A single frame may be lost during transmission. Alternatively, multiple frames may be lost. In each case, a reference frame mismatch may degrade visual quality and permit propagation of errors. Loss of multiple frames may happen in applications, such as broadcasting, in which multiple frames are placed within the same packet. Consequently, when the packet is lost, multiple frames may be lost. The arrows at the top of the frames of bitstream 124B illustrate the possible dependencies that may result if error concealment is not performed. In particular, the arrows show a changed dependency where frame $P_4$ now improperly depends on the I frame instead of frame $P_1$.

In the example of FIG. 9A, it is assumed that Frame $P_4$ is intended to depend on a third preceding frame, as indicated by applicable reference frame index information. With the lost frames however, frame $P_4$ depends not on frame $P_1$, but from the third preceding frame not counting the two lost frames, i.e., the I frame. In other words, $P_4$ still points back three frames, but points to the I frame when the originally intended reference frames $P_2$ and $P_3$ are lost from the bitstream. This reference frame mismatch is mainly due to the lost frames. A decoder may not be aware of losing frames $P_2$ and $P_3$ because the decoding process only generates video frames based on frame data that is actually received in the bitstream.

After decoding frame $P_1$, a decoder may accept frame $P_4$ as the next frame in the sequence and identify its reference frame according to a reference frame index (three frames previous) in the bitstream as the I frame instead of the $P_1$ frame. Hence, the loss of frames $P_2$ and $P_3$ produces a reference frame mismatch for frame $P_4$. This reference frame mismatch can degrade visual quality of frame $P_4$ during video playback and possibly propagate the resulting error to subsequent video frames.

In accordance with the techniques described in this disclosure, video decoder 26 may be configured to identify the decoding error as described above and replace the lost frames to generate bitstream 124. In this manner, video decoder 26 may identify and compensate for the gap between two frames when one or more intervening frames have been lost or otherwise corrupted during transmission, thereby correcting reference frame mismatch. In operation, decoding engine 32 of FIG. 2 may receive bitstream 122, determine the start of each segment of the I frame, and decode those segments, outputting the decoded video data to error handling module 32. Error detection module 40 of error handling module 32 as depicted in FIG. 3 proceeds to determine whether any decoding errors occurred. In this manner, decoding engine 32 and error handling module 34 continue to decode frames $P_0$ and $P_1$ until error detection module 40 detects lost frames $P_2$ and $P_3$.

As described above, prior to detecting these errors, error detection module 40 may receive the start of the segment, e.g., MB number of 0 (as the error occurs at the start of frame $P_2$), and a frame number identifying the relative position of the segment in the encoded video data. The frame number may be obtained, for example, in an H.264 or similar implementation by accessing the frame number syntax element in a slice header. Comparison of consecutive frame numbers may reveal whether intervening frames have been lost. If frame numbers are used, the video decoder can simply keep track of consecutive frame numbers and determine the frame reference difference. If the frame number difference is greater than one, then at least one entire frame is missing. The number of missing frames should generally track the frame number difference.

In some instances, where the frame number is corrupted, error detection module 40 may determine the start frame number by adding one to a previously stored start frame number or end frame number, such as start frame 48C or end frame 48D. Error mapping module 42 may store the start MB number and start frame number to mapping 48 as start MB 48A and start frame 48C. Error detection module 40 may inform decoding engine 32 of the error and set error flag 46.

Error detection module 40 may alternatively, or additionally, employ external mechanisms to detect the error, such as real-time protocol (RTP) timing information. For RTP timing information, error detection module 40 may determine directly how many frames were lost by checking the time difference between consecutively received frames and dividing the time difference by a frame interval, which is assumed to be constant. Constant frame intervals are found in some applications, such as broadcasting application. For applications where the frame interval is not commonly constant, such as video telephony, however, a frame number method of determining an error may be employed.

Decoding engine 32 may resynchronize decoding in response to the error by accessing the next available NAL header. In this instance, decoding engine 32 may access the first NAL header of frame $P_4$, passing the start, e.g., start MB number, of this segment of frame $P_4$ and the frame number corresponding to frame $P_4$ to error detection module 40. Error detection module 40 determines the state of error flag 46 and, finding it set, determines the end of the previous segment based on the received MB number and frame number corresponding to frame $P_4$.

For example, assuming decoding engine 32 determines the start MB number is 0 and the start frame number is 5 when decoding frame $P_4$, error detection module 40 may compute an end MB number for the previous frame of 98 (assuming error detection module 40 was informed of a maximum frame length of 98 MBs) and an end frame number of 4. Error mapping module 42 may store these end MB numbers and end frame numbers to mapping 48 as end MB 48B and end frame 48D. As a result, error concealment module 36 may not conceal the error until the first slice header for frame $P_4$ is decoded, as error detection module 40 may not detect the end of the decoding error and error mapping module 42 may not forward mapping 48 to concealment engine 50 until mapping 48 is fully specified.

Error mapping module 42 may then forward mapping 48 to error concealment module 36. Error concealment module 36 may evaluate mapping 48 and determine, based on subtracting the end frame number of 4 from a start frame number of, e.g., 2, that 2 frames were lost. Considering further that the start MB number is 0 and end MB number is 98, error concealment module 36 may further determine that two full frames were lost or corrupted. With reference to FIG. 9B, concealment engine 50 may therefore insert two full frames into bitstream 122, e.g., directly or in conjunction with decoding engine 32, to generate bitstream 124B in reconstruction buffer 38, in addition to performing MB concealment in the slices outside the two lost frames.

Bitstream 124B, as shown in FIG. 9B, includes two additional frames in place of the previously lost frames. This frame insertion technique is not performed until after the video data of frame $P_4$ has been received and decoded. These additional frames are both designated as "$P_1$" in bitstream 124B of FIG. 9B to represent that concealment engine 50 conceals the two lost frames by repeating frame $P_1$ twice and inserts these two repeat frames into reconstruction buffer 38 prior to frame $P_4$. With the presence of the repeated $P_1$ frames, in place of lost frames $P_2$ and $P_3$, frame $P_4$ still references the frame three frames behind it in the bitstream, but in this case that frame is more properly a repeated frame $P_1$ rather than the I frame.

As an alternative, concealment engine 50 may not replace frames, but instead may modify the reference frame dependencies coded within NAL headers of one of the frames, such as frame $P_4$. For example, concealment engine 50 may receive mapping 48 and add one end frame number 48D to access frame $P_4$ in reconstruction buffer 38. On this basis, concealment engine 50 may modify the reference index of the bitstream so that frame $P_4$ refers to the correct frame. For example, concealment engine 50 may next access a NAL header of frame P4 and modify a dependency syntax element such that frame $P_4$ depends on frame $P_1$ and not the I frame, as shown in bitstream 122. It may be easier to simply insert new frames in the reference frame buffer. In either event, frame $P_4$ can now be decoded and reconstructed using frame $P_1$ as its reference for predictive coding, thereby preventing decoding errors from propagating to frame $P_4$ and other subsequent frames and performing accurate reconstruction of frame $P_4$.

Although bitstream 124B represents repeating frames as a convenient concealment mechanism, concealment engine 50 may perform other concealment techniques to conceal or otherwise replace the lost frames. The efficient error handling techniques described in this disclosure therefore should not be strictly limited in this regard. For example, the error handling techniques may be implemented such that concealment engine 50 applies a more complicated motion compensated frame interpolation scheme to create smoother motion when viewing frames $P_1$ through $P_4$. Hence, the two lost frames $P_2$ and $P_3$ can be reproduced by simply repeating frame $P_1$ twice or, alternatively, interpolation or other more complex techniques may be used to reproduce approximations of lost frames $P_2$ and $P_3$.

For example, concealment engine 50 may insert the two frames, thereby correcting the dependencies such that frame $P_4$ correctly depends from frame $P_1$ and decode frame $P_4$. In some aspects, concealment engine 50 may access frames $P_1$ and $P_4$ in reconstruction buffer 38 and estimate the repeated frames $P_1$ based on the motion determined between frames $P_1$ and $P_4$ using a frame interpolation scheme, as mentioned above. By estimating repeated frames $P_1$ in this manner, concealment engine 50 may produce approximated frames $P_2$ and $P_3$ that smooth motion when viewed during playback. In any event, by correcting the reference frame mismatch, this concealment technique may permit frame $P_4$ to use the frame $P_1$ as its prediction reference frame without substantially modifying the decoding process, allowing frame $P_4$ to be accurately reconstructed.

FIG. 9C generally corresponds to the scenario outlined in FIGS. 9A and 9B, but illustrates the loss of a single frame $P_2$, rather than two consecutive frames $P_2$ and $P_3$. In this case, although the frame mismatch is only one, frames $P_3$ and $P_4$ will still reference the wrong frames. FIG. 9C shows original encoded bitstream 120 and the received bitstream 123 in which an entire frame $P_2$ is lost. In this case, as shown in bitstream 125 of FIG. 9C, concealment engine 50 may repeat frame $P_1$ in place of frame $P_2$ to eliminate the reference frame mismatch. As a result, frames $P_4$ may reference the correct frame. Again, reference frame mismatch may be detected by comparing frame numbers, using RTP information, or by other techniques. In addition, replacing frame $P_2$ may be accomplished by simply repeating a frame, such as frame $P_1$, or interpolating a frame to replace frame $P_2$.

Figure 10:
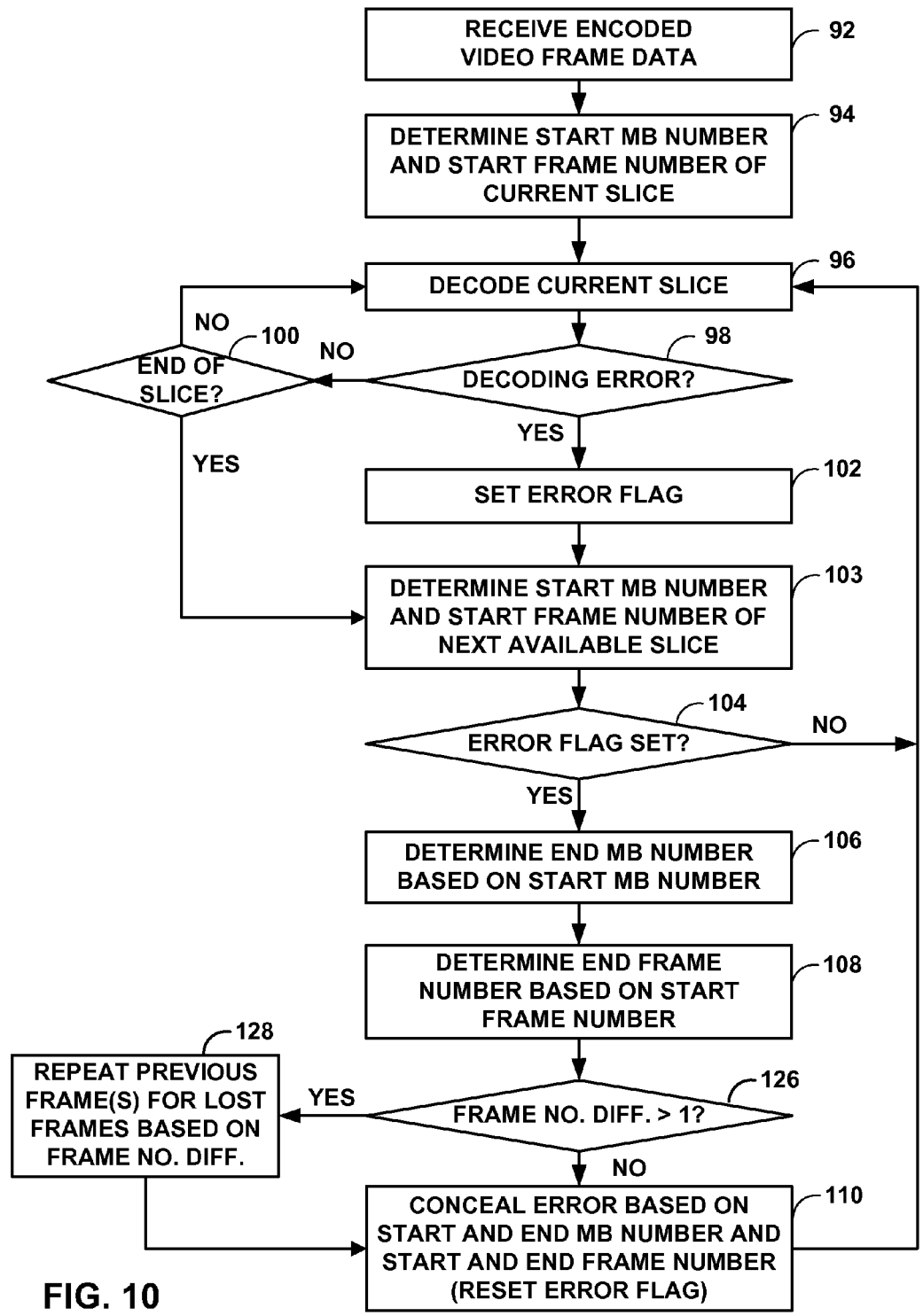
FIG. 10 is a flowchart illustrating example operation of a video decoder in performing error handling and concealment for lost frames in a bitstream that permits multiple reference frames.

FIG. 10 is a flowchart illustrating example operation of a video decoder in performing error handling and concealment for lost frames in a bitstream that permits multiple reference frames. The flowchart of FIG. 10 corresponds substantially to the flowchart of FIG. 7. For example, FIG. 10 illustrates a process in which video decoder 26 receives encoded video frame data (92), and determines a start MB number and start frame number of a current slice that is being decoded (94). In the course of decoding the current slice (96), if a decoding error is detected (98), error detection module 40 may set the error flag (102). If there is no decoding error (98), and the end of the slice has not yet been reached (100), video decoder 26 continues to decode the current slice. If the end of the slice has been reached (100), or an error is detected (98) and the error flag has been set (102), video decoder 26 proceeds to the next available slice and determines its start MB number and start frame number (103).

If the error flag is set (104), error mapping module 42 may determine the end MB number of the lost or corrupted data segment based on the start MB number of the next available slice (106), and determines the end frame number based on the start frame number of the next available slice (108). In addition, to permit insertion of repeated frames when one or more frames are lost, error mapping module 42 may be configured to determine whether the difference between the start frame number and the end frame number is greater than one (126). If so, there is at least one frame missing from the bitstream. The number of frames missing from the bitstream will ordinarily be equal to the frame number difference minus one. Accordingly, if the frame number difference is three, there typically will be two missing frames from the bitstream.

Upon determining that the frame number difference, i.e., the difference between the start frame number and the end frame number, is greater than one, error mapping module 42 may direct error concealment module 36 to repeat the previous frame and insert it in place of the missing frames (128). As described above, instead of repeating a previous frame, concealment module 36 may be configured to produce replacement frames by other techniques such as motion compensated interpolation. As an alternative, instead of replacing frames, concealment module 36 may be configured to adjust reference frame index information for one or more later frames, e.g., by adding the number of lost frames (i.e., the frame difference number minus one) to the reference index so that the later frames use the appropriate reference frames.

The number of lost frames that are replaced by repeated or interpolated frames may be based on the frame difference (128). If the frame number difference is three, for example, the previous frame may be repeated once, i.e., for the next two frames. If the frame number difference is two, the previous frame may be repeated once, i.e., for the next frame. Accordingly, the number of replaced frames may be equal to the frame number difference minus one. If the frame number difference is not greater than one (126), or a sufficient number of lost frames have been replaced (128), error concealment module 36 may conceal error based on the start and end MB number and start and end frame number (110), e.g., as described with reference to FIG. 7, and reset the error flag (110) in advance of decoding the next available slice as the current slice (96).

Along with repeating the previous frames, or applying an alternative concealment mechanism, error concealment module 36 may proceed to apply techniques for concealment of MBs that were not replaced (110), and then may proceed to decode the next available slice as the current slice (96). The next available slice used as the current slice is, for example, the slice for which the start MB and start frame numbers are obtained (103). In addition to repeating the lost frames, error concealment module 36 may conceal any MBs in the current slice and frame.

With knowledge, from the start and end frame numbers, that the error spans more than one frame, error concealment module 36 may conceal MBs from the start MB through MB 98 (assuming 98 MBs is the applicable maximum number) of the current frame. In addition, error concealment module 36 may conceal the MBs that followed the last replaced frame up to the point of the next available slice, i.e., up to the end MB number. Accordingly, concealment may include a combination of concealing MBs in a first frame, repeating the first frame for one or more lost frames, and concealing MBs in the frame that follows the lost frames.

Figure 11A:
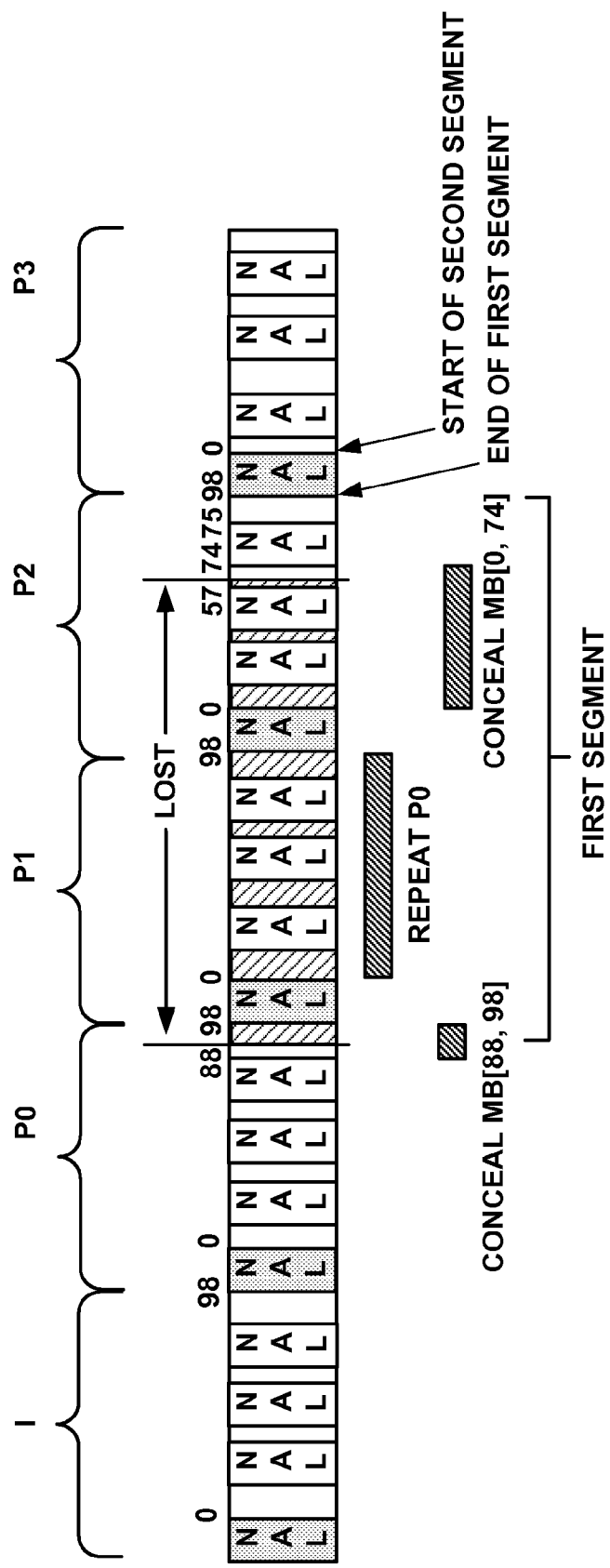
FIGS. 11A and 11B are diagrams illustrating application of error handling and concealment techniques to example bitstreams that permit multiple reference frames.
Figure 11B:
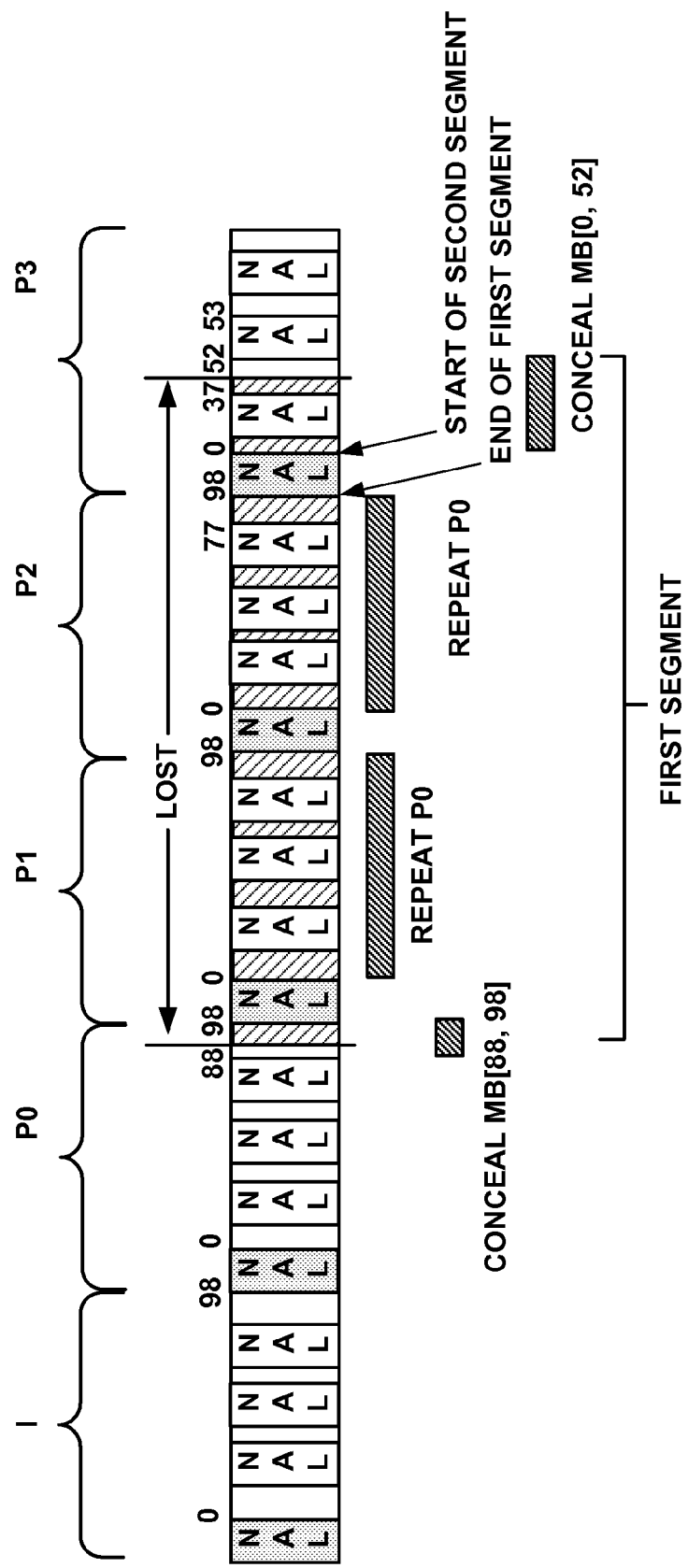

FIGS. 11A and 11B are diagrams illustrating application of error handling and concealment techniques to example bitstreams that permit multiple reference frames. In the example of FIG. 11A, the bitstream includes a first I frame and four consecutive P frames ($P_0$, $P_1$, $P_2$, $P_3$). A decoding error results in loss of MBs starting at MB 88 (which is the start of the slice in which the decoding error starts) of frame $P_0$ and extending through frame $P_1$ and up to MB 57 of frame $P_2$. In this case, the start MB and start frame number are MB 88 and frame $P_0$, respectively. If the next available slice in frame $P_2$ starts at MB 75, then the end MB and end frame number are MB 74 and 3 (for frame $P_2$), respectively.

In the example of FIG. 11A, the frame number difference between frames $P_2$ and $P_0$ is 3−1=2, indicating loss of one entire frame (frame $P_1$). Error concealment module 36 conceals MBs 88-98 of frame $P_0$, conceals frame $P_1$ by repeating frame $P_0$, and conceals MBs 0-74 of frame $P_2$. For example, error mapping module 34 may indicate that the decoding error spans frame $P_0$ and $P_1$, indicating that $P_0$ should be concealed from the start MB 88 through the end of the frame at MB 98. In operation 110 of FIG. 10, error mapping module 42 may map two error ranges, one for the lost MBs in $P_0$ prior to the replaced frame $P_1$ (replaced by repeating frame $P_0$), and another for the lost MBs in frame $P_2$ after the replaced frame $P_1$. The first error range may specify the start MB as MB 88 of frame $P_0$ and the end MB as MB 98 of frame $P_0$. Error concealment module 36 may then conceal MBs in this first error range.

The second error range may specify the start MB as the next MB after the replaced frame $P_1$, i.e., MB 0 in frame $P_2$, and keep the existing end MB, i.e., MB 74 in frame $P_2$. Error concealment module 36 may then conceal MBs in this second error range. Hence, with the repetition of the resulting frame $P_0$ to conceal frame $P_1$, error mapping module 34 may compute a new start MB and start frame number as MB 0 and frame $P_2$, respectively, and use the previously computed end MB and end frame number. Using these numbers, error concealment module 36 can conceal MBs in frame $P_2$ starting at the start MB of 0 and extending to the end MB of 74, which has been computed as the start MB of the next available slice minus one.

Other techniques for handling the concealment of MBs when a frame is repeated may be used. Error handling module 34 may handle the concealment of the lost MBs in frame $P_1$ in a variety of ways. Accordingly, the process described with reference to FIG. 11A is provided for purposes of illustration.

In the example of FIG. 11B, the decoding error spans part of frame $P_0$, all of frames $P_1$ and $P_2$, and part of frame $P_3$. In this case, the start MB is MB 88 and the start frame is frame $P_0$. The end MB is MB 52, assuming that the next available slice starts at MB 53 of frame $P_3$. The end frame is frame $P_3$. In this case, the frame number difference for end frame $P_3$ and start frame $P_0$ is 3−0=3. Therefore, there are two lost frames ($P_1$ and $P_2$) in the bitstream.

Error mapping module 42 may map a first error range from start MB 88 of the slice in which the error was detected in frame $P_0$, and a second error range extending from the start of frame $P_3$ to the end MB 52 (the start MB for the next available slice minus one). However, there is no need for a look-ahead operation. Instead, video decoder 26 may reside on the status of an error flag when it reaches frame $P_3$ to trigger error concealment. Error concealment module 36 conceals the MBs [88, 98] in frame $P_0$, e.g., directly, via decoding engine 32, or otherwise, repeats frame $P_0$ for lost frames $P_1$ and $P_2$, and conceals MBs [0, 52] in frame $P_3$. Video decoder 26 then may proceed to decode the remaining slices in frame $P_3$.

As described above, the techniques may offer low computational overhead as error handling occurs after an actual error is detected. As a result, the techniques may provide low power consumption as unnecessary computation may be avoided, and reduce communications and interruptions in implementations of the techniques involving two or more processors, such as when a digital signal processor (DSP) implements a parser and an application specific integrated circuit (ASIC) implements pixel reconstruction. The techniques also may provide a more effective hardware architecture and implementation when compared to look-ahead decoding techniques, as the techniques described in this disclosure operate in a sequential manner instead of a non-sequential manner. The techniques may further improve video quality by reducing the impact of decoding errors through accurate identification of segments that require concealment.

The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable medium comprising instructions that, when executed, cause a processor to perform one or more of the methods described above.

A computer-readable medium may form part of a computer program product, which may include packaging materials. A computer-readable medium may comprise a computer data storage medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more DSPs, general purpose microprocessors, ASICs, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules. The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various aspects of the disclosed techniques have been described. These and other aspects are within the scope of the following claims.

The invention claimed is:

1. A video decoding method comprising:
   determining a start of a current unit of encoded video data;
   decoding at least a portion of the current unit without determining a start of a next available unit of the encoded video data;
   detecting a decoding error in the current unit;
   when the decoding error is detected, determining the start of the next available unit of the encoded video data;
   determining an end of a corrupted data segment based on the start of the next available unit, wherein the current unit is a current slice of a first frame, and the corrupted data segment includes the current slice and at least one additional slice of encoded video data from a second frame; and
   concealing the corrupted data segment based on the start of the current unit and the end of the corrupted data segment.

2. The method of claim 1, wherein each of the current unit and the next available unit includes a video data slice.

3. The method of claim 1, further comprising:
   if the decoding error is detected, setting an error flag to indicate the detection of the decoding error; and
   determining the end of the corrupted data segment based on the start of the next available unit when the error flag is set.

4. The method of claim 3, wherein the next available unit comprises at least one slice, the method further comprising seeking a slice header associated with the slice when the decoding error is detected.

5. The method of claim 3, further comprising, if the decoding error is detected, stopping decoding of the current unit, and proceeding to decode the next available unit.

6. The method of claim 1, further comprising, if the decoding error is not detected, decoding the entire first unit.

7. The method of claim 1, wherein the decoding error comprises at least one of a syntax error, semantic error, or entropy coding error.

8. The method of claim 1, wherein determining a start of the current unit comprises determining a first macroblock (MB) number associated with the start of the current unit, determining an end of the corrupted data segment comprises determining a second MB number prior to a start of the second unit, and concealing comprises concealing the corrupted data segment from the first MB number to the second MB number.

9. The method of claim 8, wherein determining a start of the second unit comprises determining a third MB number associated with the start of the second unit, and wherein determining the second MB number comprises subtracting one from the third MB number to produce the second MB number.

10. The method of claim 8, wherein determining a start of the first unit comprises determining a first macroblock (MB) number and a first frame number associated with the start of the first unit, determining an end of the corrupted data segment comprises determining a second MB number and a second frame number associated with the end of the corrupted data segment, and concealing comprises concealing at least a portion of the corrupted data segment based on the first and second MB numbers and the first and second frame numbers, wherein the first and second frame numbers are different.

11. The method of claim 1, further comprising:
  detecting a loss of one or more frames; and
  replacing the one or more lost frames to conceal a reference frame mismatch for another frame.

12. A video decoding device comprising:
  means for determining a start of a current unit of encoded video data;
  means for decoding at least a portion of the current unit without detecting a start of a next available unit of the encoded video data;
  means for detecting a decoding error in the current unit;
  means for determining, when the decoding error is detected, the start of the next available unit of the encoded video data;
  means for determining, an end of a corrupted data segment based on the start of the next available unit, wherein the current unit is a current slice of a first frame, and the corrupted data segment includes the current slice and at least one additional slice of encoded video data from a second frame; and
  means for concealing the corrupted data segment based on the start of the current unit and the end of the corrupted data segment.

13. The device of claim 12, wherein each of the current unit and the next available unit includes a video data slice.

14. The device of claim 12, further comprising:
  means for setting, if the decoding error is detected, an error flag to indicate the detection of the decoding error; and
  means for determining the end of the corrupted data segment based on the start of the next available unit when the error flag is set.

15. The device of claim 14, wherein the next available unit comprises at least one slice, the device further comprising means for seeking a slice header associated with the slice when the decoding error is detected.

16. The device of claim 14, further comprising means for, if the decoding error is detected, stopping decoding of the current unit, and proceeding to decode the next available unit.

17. The device of claim 12, further comprising means for decoding, if the decoding error is not detected, the entire first unit.

18. The device of claim 12, wherein the decoding error comprises at least one of a syntax error, semantic error, or entropy coding error.

19. The device of claim 12, wherein the means for determining a start of the current unit comprises means for determining a first macroblock (MB) number associated with the start of the current unit, the means for determining an end of the corrupted data segment comprises means for determining a second MB number prior to a start of the second unit, and the means for concealing comprises means for concealing the corrupted data segment from the first MB number to the second MB number.

20. The device of claim 19, wherein the means for determining a start of the second unit comprises means for determining a third MB number associated with the start of the second unit, and wherein the means for determining the second MB number comprises means for subtracting one from the third MB number to produce the second MB number.

21. The device of claim 19, wherein the means for determining a start of the first unit comprises means for determining a first macroblock (MB) number and a first frame number associated with the start of the first unit, the means for determining an end of the corrupted data segment comprises means for determining a second MB number and a second frame number associated with the end of the corrupted data segment, and the means for concealing comprises means for concealing at least a portion of the corrupted data segment based on the first and second MB numbers and the first and second frame numbers, wherein the first and second frame numbers are different.

22. The device of claim 12, further comprising:
  means for detecting a loss of one or more frames; and
  means for replacing the one or more lost frames to conceal a reference frame mismatch for another frame.

23. A video decoding device comprising:
  a decoding engine that decodes at least a portion of a current unit of encoded video data before a start of a next available unit of the encoded video data is determined;
  an error detection module that detects a decoding error in the current unit;
  an error mapping module that determines a start of the current unit, determines, when the decoding error is detected, the start of the next available unit of the encoded video data and, determines an end of a corrupted data segment based on the start of the next available unit, wherein the current unit is a current slice of a first frame, and the corrupted data segment includes the current slice and at least one additional slice of encoded video data from a second frame; and
  an error concealment module that conceals the corrupted data segment based on the start of the current unit and the end of the corrupted data segment.

24. The device of claim 23, wherein each of the current unit and the next available unit includes a video data slice.

25. The device of claim 23, wherein the error detection module sets an error flag to indicate the detection of the decoding error, and the error mapping module determines the end of the corrupted data segment based on the start of the next available unit when the error flag is set.

26. The device of claim 25, wherein the next available unit comprises at least one slice, and the decoding engine seeks a slice header associated with the slice when the decoding error is detected.

27. The device of claim 25, wherein, if the decoding error is detected, the decoding engine stops decoding of the current unit, and proceeds to decode the next available unit.

28. The device of claim 23, wherein the decoding engine decodes the entire first unit if the decoding error is not detected.

29. The device of claim 23, wherein the decoding error comprises at least one of a syntax error, semantic error, or entropy coding error.

30. The device of claim 23, wherein the error mapping module determines a first macroblock (MB) number associated with the start of the current unit, and determines a second MB number prior to a start of the second unit, and the error concealment module conceals the corrupted data segment from the first MB number to the second MB number.

31. The device of claim 30, wherein the error mapping module determines a third MB number associated with the start of the second unit, and determining the second MB number by subtracting one from the third MB number to produce the second MB number.

32. The device of claim 30, wherein the error mapping module determines a first macroblock (MB) number and a first frame number associated with the start of the first unit, and determines a second MB number and a second frame number associated with the end of the corrupted data segment, and the error concealment module conceals at least a portion of the corrupted data segment based on the first and second MB numbers and the first and second frame numbers, wherein the first and second frame numbers are different.

33. The device of claim 23, wherein the error concealment module detects a loss of one or more frames, and replaces the one or more lost frames to conceal a reference frame mismatch for another frame.

34. The device of claim 23, wherein the device comprises a wireless communication device handset.

35. The device of claim 23, wherein the device comprises an integrated circuit device.

36. A non-transitory computer-readable medium comprising instructions to cause one or more processors to:
   determine a start of a current unit of encoded video data;
   decode at least a portion of the current unit without determining an end of a next available unit of the encoded video data;
   detect a decoding error in the current unit;
   when the decoding error is detected, determine the start of the next available unit of the encoded video data;
   determine an end of a corrupted data segment based on the start of the next available unit, wherein the current unit is a current slice of a first frame, and the corrupted data segment includes the current slice and at least one additional slice of encoded video data from a second frame; and
   conceal the corrupted data segment based on the start of the current unit and the end of the corrupted data segment.

37. The non-transitory computer-readable medium of claim 36, wherein each of the current unit and the next available unit includes a video data slice.

38. The non-transitory computer-readable medium of claim 36, further comprising instructions to cause the one or more processors:
   set an error flag to indicate the detection of the decoding error if the decoding error is detected; and
   determine the end of the corrupted data segment based on the start of the next available unit when the error flag is set.

39. The non-transitory computer-readable medium of claim 38, wherein the next available unit comprises at least one slice, and the instructions cause the one or more processors to seek a slice header associated with the slice when the decoding error is detected.

40. The non-transitory computer-readable medium of claim 38, further comprising instructions to cause the one or more processors to, if the decoding error is detected, stop decoding of the current unit, and proceed to decode the next available unit.

41. The non-transitory computer-readable medium of claim 36, wherein the instructions cause the one or more processors to decode the entire first unit if the decoding error is not detected.

42. The non-transitory computer-readable medium of claim 36, wherein the decoding error comprises at least one of a syntax error, semantic error, or entropy coding error.

43. The non-transitory computer-readable medium of claim 36, wherein the instructions cause the one or more processors to determine a first macroblock (MB) number associated with the start of the current unit, determine a second MB number prior to a start of the second unit, and conceal the corrupted data segment from the first MB number to the second MB number.

44. The non-transitory computer-readable medium of 43, wherein the instructions cause the one or more processors to determine a third MB number associated with the start of the second unit, and subtract one from the third MB number to produce the second MB number.

45. The non-transitory computer-readable medium of claim 43, wherein the instructions cause the one or more processors to determine a first macroblock (MB) number and a first frame number associated with the start of the first unit, determine a second MB number and a second frame number associated with the end of the corrupted data segment, and conceal at least a portion of the corrupted data segment based on the first and second MB numbers and the first and second frame numbers, wherein the first and second frame numbers are different.

46. The non- transitory _computer-readable medium of claim 36, wherein the instructions cause the one or more processors to:
   detect a loss of one or more frames; and
   replace the one or more lost frames to conceal a reference frame mismatch for another frame.

47. An apparatus comprising:
   a processor configured to determine a start of a current unit of encoded video data, decode at least a portion of the current unit without determining an end of a next available unit of the encoded video data, detect a decoding error in the current unit, when the decoding error is detected, determine the start of the next available unit of the encoded video data, determine an end of a corrupted data segment based on the start of the next available unit, wherein the current unit is a current slice of a first frame, and the corrupted data segment includes the current slice and at least one additional slice of encoded video data from a second frame, and conceal the corrupted data segment based on the start of the current unit and the end of the corrupted data segment.

* * * * *